(12) United States Patent
Goldsmith et al.

(10) Patent No.: US 7,789,778 B2
(45) Date of Patent: Sep. 7, 2010

(54) HOCKEY STICK

(75) Inventors: Edward M. Goldsmith, Studio City, CA (US); Christopher K. DeLap, San Diego, CA (US)

(73) Assignee: Easton Sports, Inc., Van Nuys, CA (US)

( * ) Notice: Subject to any disclaimer, the term of this patent is extended or adjusted under 35 U.S.C. 154(b) by 0 days.

(21) Appl. No.: 12/327,647

(22) Filed: Dec. 3, 2008

(65) Prior Publication Data

US 2009/0093326 A1   Apr. 9, 2009

Related U.S. Application Data

(60) Division of application No. 11/485,642, filed on Jul. 11, 2006, which is a continuation of application No. 10/826,983, filed on Apr. 16, 2004, now Pat. No. 7,097,577, which is a continuation of application No. 10/290,052, filed on Nov. 6, 2002, now abandoned, which is a continuation of application No. 09/663,598, filed on Sep. 15, 2000, now abandoned.

(51) Int. Cl.
   *A63B 59/14* (2006.01)
(52) U.S. Cl. .................................................... 473/563
(58) Field of Classification Search .......... 473/560–563
   See application file for complete search history.

(56) References Cited

U.S. PATENT DOCUMENTS

| | | | | |
|---|---|---|---|---|
| 1,601,116 | A | 9/1926 | Hall | |
| 2,201,706 | A | 5/1940 | Sukohl | 154/40 |
| 2,304,322 | A | 12/1942 | Werlich | 273/67 |
| 2,649,133 | A | 8/1953 | Just | 154/1.8 |
| 2,674,557 | A | 4/1954 | Boggs | 154/83 |
| 2,762,739 | A | 9/1956 | Weiss | 154/90 |
| 2,774,596 | A | 12/1956 | Bredenberg | 273/67 |
| 2,912,245 | A | 11/1959 | Gardner | 273/67 |
| 2,964,065 | A | 12/1960 | Haroldson | 138/76 |
| 3,020,192 | A | 2/1962 | Stephens et al. | 156/423 |
| 3,125,478 | A | 3/1964 | Pratt | 156/184 |
| 3,353,826 | A | 11/1967 | Traverse | 273/67 |
| 3,489,412 | A | 1/1970 | Franck et al. | 273/67 |
| 3,533,623 | A | 10/1970 | Dumont | 273/67 |
| 3,544,104 | A | 12/1970 | Jenks | 272/66 |

(Continued)

FOREIGN PATENT DOCUMENTS

CA   489072   12/1952

(Continued)

*Primary Examiner*—Mark S Graham
(74) *Attorney, Agent, or Firm*—Orrick Herrington & Sutcliffe LLP

(57) ABSTRACT

A hockey stick having a composite blade and a shaft is disclosed. The composite blade includes a heel section that is recessed relative to the front and back faces of the blade. The recessed heel section is configured to be received by a hockey stick shaft or an adapter member configured to connect the blade to the shaft. The composite blade preferably comprise a foam inner core overlaid preferably with substantially continuous fibers disposed in a matrix material and may include an internal bridge structure extending from one side of the blade to the other. The blade may also be preferably comprised of a core comprising non-continuous fibers disposed within a matrix material. In another aspect, processes for manufacturing the previously described hockey stick blade(s) are described.

42 Claims, 12 Drawing Sheets

U.S. PATENT DOCUMENTS

| | | | |
|---|---|---|---|
| 3,561,760 A | 2/1971 | Klay | 273/67 |
| 3,563,546 A | 2/1971 | Dawe | 273/67 |
| 3,631,897 A | 1/1972 | Fischer et al. | 138/141 |
| 3,638,942 A | 2/1972 | Bassett | 273/67 A |
| 3,720,410 A | 3/1973 | Saytar | 273/67 A |
| 3,727,936 A | 4/1973 | Klir et al. | 280/11.13 L |
| 3,809,401 A | 5/1974 | Hankele | 273/67 A |
| 3,813,098 A | 5/1974 | Fischer et al. | 273/72 R |
| 3,851,880 A | 12/1974 | Ritch | 273/128 R |
| 3,859,162 A | 1/1975 | Johnson et al. | 161/160 |
| 3,910,578 A | 10/1975 | Brine, Jr. | 273/96 D |
| 3,934,875 A | 1/1976 | Easton et al. | 273/67 A |
| 3,961,790 A | 6/1976 | Milligan | 273/67 A |
| 3,970,324 A | 7/1976 | Howat | 280/610 |
| 3,982,760 A | 9/1976 | Tiitola | 273/67 A |
| 4,013,288 A | 3/1977 | Goverde | 273/67 A |
| 4,013,810 A | 3/1977 | Long | 428/308 |
| D244,790 S | 6/1977 | Carlson et al. | |
| 4,052,499 A | 10/1977 | Goupil et al. | 264/265 |
| 4,059,269 A | 11/1977 | Tiitola | 273/67 A |
| 4,061,520 A | 12/1977 | Cecka et al. | 156/245 |
| 4,070,020 A | 1/1978 | Dano | 273/73 F |
| 4,070,021 A | 1/1978 | Cecka et al. | 273/73 F |
| 4,076,240 A | 2/1978 | Haddad | 273/67 A |
| 4,084,818 A | 4/1978 | Goupil et al. | 273/67 A |
| 4,086,115 A | 4/1978 | Sweet, Jr. et al. | 156/178 |
| 4,124,208 A | 11/1978 | Burns | 273/67 A |
| 4,124,670 A | 11/1978 | Cecka et al. | 264/45.3 |
| 4,128,963 A | 12/1978 | Dano | 264/46.6 |
| 4,129,634 A | 12/1978 | Cecka et al. | 264/45.3 |
| 4,134,587 A | 1/1979 | Diederich | 273/67 A |
| 4,148,482 A | 4/1979 | Harwell, Jr. et al. | 273/67 A |
| 4,159,114 A | 6/1979 | Ardell et al. | 273/67 A |
| 4,172,594 A | 10/1979 | Diederich | 237/67 A |
| 4,180,413 A | 12/1979 | Diederich | 156/185 |
| 4,200,479 A | 4/1980 | Ardell et al. | 156/154 |
| 4,212,461 A | 7/1980 | Cecka et al. | 273/73 F |
| 4,239,215 A | 12/1980 | Farr | 273/29 A |
| 4,241,115 A | 12/1980 | Temin | 427/384 |
| 4,273,601 A | 6/1981 | Weingart | 156/189 |
| 4,320,160 A | 3/1982 | Nishimura et al. | 428/107 |
| 4,343,468 A | 8/1982 | Lindgren | 273/67 A |
| 4,351,528 A | 9/1982 | Duplin | 273/67 A |
| 4,353,549 A | 10/1982 | Goupil et al. | 273/67 A |
| 4,358,113 A | 11/1982 | McKinnon et al. | 273/67 A |
| 4,358,117 A | 11/1982 | Deutsch | 273/326 |
| 4,361,325 A | 11/1982 | Jansen | 273/67 A |
| 4,369,970 A | 1/1983 | Salminen | 273/67 A |
| 4,461,479 A | 7/1984 | Mitchell | 273/81 A |
| 4,488,721 A * | 12/1984 | Franck et al. | 473/563 |
| 4,504,344 A | 3/1985 | Helle et al. | 156/185 |
| 4,512,573 A | 4/1985 | Coolen | 273/67 A |
| 4,520,042 A | 5/1985 | Smith | 427/209 |
| 4,537,398 A | 8/1985 | Salminen | 273/67 A |
| 4,570,932 A | 2/1986 | Cote | 273/67 A |
| 4,579,617 A | 4/1986 | Öberg et al. | 156/184 |
| 4,591,155 A | 5/1986 | Adachi | 273/67 A |
| 4,600,192 A | 7/1986 | Adachi | 273/67 A |
| 4,651,990 A | 3/1987 | Profit | 273/67 A |
| 4,660,832 A | 4/1987 | Shomo | 273/73 J |
| 4,664,379 A | 5/1987 | Melby | 273/67 A |
| 4,684,130 A | 8/1987 | Drolet et al. | 273/67 A |
| 4,739,994 A | 4/1988 | Lewis, Jr. | 273/326 |
| 4,765,856 A | 8/1988 | Doubt | 156/212 |
| 4,770,915 A | 9/1988 | Nakagawa et al. | 428/74 |
| 4,793,616 A | 12/1988 | Fernandez | 273/167 H |
| 4,799,985 A | 1/1989 | McMahon et al. | 156/166 |
| 4,818,318 A | 4/1989 | McMahon et al. | 156/166 |
| 4,871,491 A | 10/1989 | McMahon et al. | 264/29.2 |
| 4,874,563 A | 10/1989 | McMahon et al. | 264/29.2 |
| 4,923,541 A | 5/1990 | Burger | 156/87 |
| 4,968,032 A | 11/1990 | Redekop | 273/67 A |
| 5,024,712 A | 6/1991 | Lecourt et al. | 156/184 |
| 5,042,804 A | 8/1991 | Uke et al. | 273/75 |
| 5,042,805 A | 8/1991 | Nakai | 273/80 B |
| 5,048,441 A | 9/1991 | Quigley | 114/90 |
| 5,050,878 A | 9/1991 | Deleris | 273/67 A |
| 5,067,726 A | 11/1991 | Brine, III et al. | 273/326 |
| 5,076,872 A | 12/1991 | Nakagawa et al. | 156/166 |
| 5,078,396 A | 1/1992 | Cavallaro et al. | 273/67 A |
| 5,127,649 A | 7/1992 | Cabeonero | 273/67 A |
| D329,888 S | 9/1992 | Christian | |
| 5,160,135 A | 11/1992 | Hasegawa | 273/67 A |
| 5,174,567 A | 12/1992 | Nordstrom | 273/67 A |
| 5,183,264 A | 2/1993 | Lanctot | 273/67 A |
| 5,188,872 A | 2/1993 | Quigley | 428/36.2 |
| 5,206,085 A | 4/1993 | Nakagawa et al. | 428/372 |
| 5,217,221 A | 6/1993 | Baum | 273/67 A |
| 5,242,637 A | 9/1993 | Inoue et al. | 264/45.3 |
| 5,261,662 A | 11/1993 | Prevost | 273/67 A |
| 5,303,916 A | 4/1994 | Rodgers | 273/67 A |
| 5,306,003 A | 4/1994 | Pagotto | 273/67 A |
| 5,312,100 A | 5/1994 | Ilacqua et al. | 273/67 A |
| 5,332,212 A | 7/1994 | Susi et al. | 273/67 A |
| 5,333,857 A | 8/1994 | Lallemand | 273/67 A |
| 5,364,693 A | 11/1994 | Moren et al. | 428/263 |
| 5,380,002 A | 1/1995 | Spector | 273/58 H |
| 5,407,195 A * | 4/1995 | Tiitola et al. | 473/563 |
| 5,419,553 A | 5/1995 | Rodgors | 273/67 A |
| 5,423,531 A | 6/1995 | Hoshizaki et al. | 273/67 A |
| 5,423,735 A | 6/1995 | Callinan et al. | 602/8 |
| 5,435,548 A | 7/1995 | Leduke et al. | 273/67 A |
| 5,439,215 A | 8/1995 | Ratchford | 273/67 A |
| 5,456,463 A | 10/1995 | Dolan et al. | 273/67 A |
| 5,458,330 A | 10/1995 | Baum | 273/72 R |
| RE35,081 E | 11/1995 | Quigley | 428/36.2 |
| 5,470,067 A | 11/1995 | Diresta | 273/57.2 |
| 5,492,425 A | 2/1996 | Carter et al. | 401/10 |
| 5,496,027 A | 3/1996 | Christian et al. | 273/67 A |
| 5,511,776 A | 4/1996 | Huru | 273/67 A |
| 5,520,385 A | 5/1996 | Quigley et al. | 273/57.2 |
| 5,524,884 A | 6/1996 | Haines | 273/67 R |
| 5,533,723 A | 7/1996 | Baum | 273/72 R |
| 5,549,947 A | 8/1996 | Quigley et al. | 428/36.2 |
| 5,556,677 A | 9/1996 | Quigley et al. | 428/36.2 |
| 5,558,326 A | 9/1996 | Adamson et al. | 273/67 A |
| 5,577,725 A | 11/1996 | Pagotto et al. | 273/67 A |
| 5,582,405 A | 12/1996 | Montgomery | 273/67 A |
| 5,582,406 A | 12/1996 | Babcock | 273/67 A |
| 5,593,158 A | 1/1997 | Filice et al. | 473/520 |
| 5,599,242 A | 2/1997 | Solviche et al. | 473/318 |
| 5,603,498 A | 2/1997 | Crawford et al. | 473/563 |
| 5,607,154 A | 3/1997 | Meumann et al. | 473/562 |
| 5,607,226 A | 3/1997 | Toth et al. | 362/251 |
| 5,624,115 A | 4/1997 | Baum | 473/567 |
| 5,628,509 A | 5/1997 | Christian | 473/562 |
| 5,633,299 A | 5/1997 | Van Druten et al. | 524/14 |
| 5,636,836 A | 6/1997 | Carroll et al. | 473/561 |
| 5,653,468 A | 8/1997 | Ostapyk | 280/809 |
| 5,653,643 A | 8/1997 | Falone et al. | 473/300 |
| 5,655,981 A | 8/1997 | Reed | 473/560 |
| 5,674,141 A | 10/1997 | Laforest | 473/559 |
| 5,676,608 A | 10/1997 | Christian et al. | 473/563 |
| 5,685,791 A | 11/1997 | Feeney | 473/513 |
| 5,685,792 A | 11/1997 | Ruoff | 473/563 |
| 5,688,571 A | 11/1997 | Quigley et al. | 428/36.1 |
| 5,690,850 A | 11/1997 | Anderson | 219/535 |
| 5,695,416 A | 12/1997 | Christian | 473/562 |
| 5,697,857 A * | 12/1997 | Christian et al. | 473/563 |
| 5,700,533 A | 12/1997 | You | 428/36.3 |
| 5,718,647 A | 2/1998 | Tiitola | 473/562 |
| 5,728,008 A | 3/1998 | Howard | 473/308 |
| 5,728,016 A | 3/1998 | Hsu | 473/563 |
| 5,744,528 A | 4/1998 | Callinan et al. | 524/265 |

| | | | |
|---|---|---|---|
| 5,746,955 A | 5/1998 | Calapp et al. | 264/103 |
| 5,772,541 A | 6/1998 | Buiatti | 473/520 |
| 5,816,949 A | 10/1998 | Dutchburn | 473/563 |
| 5,816,962 A | 10/1998 | Etersque | 473/563 |
| 5,816,963 A | 10/1998 | Brooks et al. | 473/564 |
| 5,823,901 A | 10/1998 | Burger | 473/560 |
| 5,827,141 A | 10/1998 | Lukey et al. | 473/563 |
| 5,839,977 A | 11/1998 | Maurer et al. | 473/446 |
| D404,449 S | 1/1999 | Burger | |
| 5,863,268 A | 1/1999 | Birch | 473/563 |
| 5,863,269 A | 1/1999 | Filice | 473/562 |
| 5,865,694 A | 2/1999 | Duong-Van | 473/520 |
| 5,865,696 A | 2/1999 | Calapp et al. | 473/561 |
| 5,866,051 A | 2/1999 | Lin et al. | 264/45.9 |
| 5,879,250 A | 3/1999 | Tahtinen et al. | 473/561 |
| 5,888,601 A | 3/1999 | Quigley et al. | 428/36.1 |
| 5,904,873 A | 5/1999 | Sadler et al. | 219/535 |
| 5,928,090 A | 7/1999 | Cabales et al. | 473/318 |
| D412,544 S | 8/1999 | Burger | |
| 5,943,767 A | 8/1999 | Milam | 29/800 |
| 5,967,913 A | 10/1999 | Sulenta | 473/560 |
| 5,979,288 A | 11/1999 | Gallagher et al. | 87/36 |
| 5,980,404 A | 11/1999 | Gentile | 473/560 |
| 5,980,674 A | 11/1999 | Burger | 156/189 |
| 5,997,970 A | 12/1999 | You | 428/36.2 |
| 6,001,035 A | 12/1999 | Roberts | 473/562 |
| 6,004,900 A | 12/1999 | O'Brien, III | 503/227 |
| 6,019,691 A * | 2/2000 | Hilborn | 473/563 |
| 6,033,326 A | 3/2000 | Lee | 473/560 |
| 6,033,327 A | 3/2000 | Bird | 473/560 |
| 6,033,328 A | 3/2000 | Bellefleur et al. | 473/561 |
| 6,036,610 A | 3/2000 | Lewark | 473/564 |
| 6,039,661 A | 3/2000 | Christian et al. | 473/562 |
| 6,045,906 A | 4/2000 | McMahon et al. | 428/364 |
| 6,062,995 A | 5/2000 | Murphy et al. | 473/562 |
| 6,062,996 A | 5/2000 | Quigley | 473/563 |
| 6,063,839 A | 5/2000 | Oosedo et al. | 523/206 |
| D430,249 S | 8/2000 | Burger | |
| 6,102,819 A | 8/2000 | Christian et al. | 473/563 |
| D431,273 S | 9/2000 | Burger | |
| 6,113,508 A | 9/2000 | Locarno et al. | 473/516 |
| 6,117,029 A | 9/2000 | Kunisaki et al. | 473/561 |
| 6,129,962 A | 10/2000 | Quigley et al. | 428/36.1 |
| 6,152,840 A | 11/2000 | Baum | 473/564 |
| 6,155,932 A | 12/2000 | Cabales et al. | 473/319 |
| 6,176,640 B1 | 1/2001 | Gonczi | 403/375 |
| 6,183,384 B1 | 2/2001 | Roberto | 473/563 |
| 6,203,447 B1 | 3/2001 | Dillard | 473/316 |
| 6,206,793 B1 | 3/2001 | Burger | 473/561 |
| D440,617 S | 4/2001 | Goldsmith et al. | |
| 6,224,505 B1 | 5/2001 | Burger | 473/561 |
| 6,234,923 B1 * | 5/2001 | Gentile | 473/563 |
| 6,241,633 B1 | 6/2001 | Conroy | 473/561 |
| 6,248,031 B1 | 6/2001 | Brodie | 473/560 |
| 6,250,193 B1 | 6/2001 | Head | 87/2 |
| 6,257,997 B1 | 7/2001 | Doble et al. | 473/516 |
| 6,267,697 B1 | 7/2001 | Sulenta | 473/560 |
| 6,273,829 B1 | 8/2001 | Carlson et al. | 473/316 |
| 6,273,835 B1 | 8/2001 | Battis et al. | 473/563 |
| 6,274,230 B1 | 8/2001 | Sarrelongue et al. | 428/293.7 |
| 6,306,474 B1 | 10/2001 | Yoshioka et al. | 428/36.4 |
| 6,352,485 B1 | 3/2002 | Philpot et al. | 473/564 |
| 6,358,166 B1 | 3/2002 | Yu | 473/561 |
| 6,364,792 B1 | 4/2002 | Evanochko | 473/560 |
| 6,364,793 B1 | 4/2002 | Valarik | 473/563 |
| 6,395,210 B1 | 5/2002 | Head et al. | 264/137 |
| 6,399,199 B1 | 6/2002 | Fujino et al. | 428/396 |
| 6,403,504 B1 | 6/2002 | McMahon et al. | 442/197 |
| 6,515,081 B2 | 2/2003 | Oosedo et al. | 525/531 |
| 6,525,125 B1 | 2/2003 | Giardello et al. | 524/439 |
| 6,565,280 B1 | 5/2003 | Post | 403/325 |
| 6,610,382 B1 | 8/2003 | Kobe et al. | 428/119 |
| 6,626,775 B2 * | 9/2003 | Tiitola | 473/563 |
| 6,918,847 B2 * | 7/2005 | Gans et al. | 473/563 |
| 7,097,577 B2 | 8/2006 | Goldsmith et al. | |
| 7,326,136 B2 * | 2/2008 | Jean et al. | 473/563 |
| 7,329,195 B2 * | 2/2008 | Pearson | 473/563 |
| 7,476,167 B2 * | 1/2009 | Garcia | 473/563 |
| 2001/0029813 A1 | 10/2001 | Schroder | 81/20 |
| 2001/0046909 A1 * | 11/2001 | Pagotto | 473/563 |
| 2002/0007022 A1 | 1/2002 | Oosedo et al. | 525/527 |
| 2002/0061374 A1 | 5/2002 | O'Brien | 428/36.9 |
| 2002/0107095 A1 | 8/2002 | Becker | 473/564 |
| 2002/0198071 A1 | 12/2002 | Snow | 473/564 |
| 2003/0004019 A1 * | 1/2003 | Lussier et al. | 473/563 |

FOREIGN PATENT DOCUMENTS

| | | |
|---|---|---|
| CA | 557838 | 5/1958 |
| CA | 633295 | 12/1961 |
| CA | 903285 | 6/1972 |
| CA | 1043065 | 11/1978 |
| CA | 1043379 | 11/1978 |
| CA | 1047561 | 1/1979 |
| CA | 1063747 | 10/1979 |
| CA | 1069147 | 1/1980 |
| CA | 1072142 | 2/1980 |
| CA | 1138912 | 1/1983 |
| CA | 1145371 | 4/1983 |
| CA | 1147767 | 6/1983 |
| CA | 1151693 | 8/1983 |
| CA | 1180728 | 1/1985 |
| CA | 1183883 | 3/1985 |
| CA | 1187525 | 5/1985 |
| CA | 1205835 | 6/1986 |
| CA | 1206309 | 6/1986 |
| CA | 1206497 | 6/1986 |
| CA | 1207350 | 7/1986 |
| CA | 1219886 | 3/1987 |
| CA | 1230898 | 12/1987 |
| CA | 2071859 | 6/1991 |
| CA | 2029109 | 5/1992 |
| CA | 2037273 | 8/1992 |
| CA | 2066476 | 10/1992 |
| CA | 1310674 | 11/1992 |
| CA | 2071022 | 12/1992 |
| CA | 2062635 | 9/1993 |
| CA | 2067087 | 10/1993 |
| CA | 1328892 | 4/1994 |
| CA | 2081439 | 4/1994 |
| CA | 2088899 | 8/1994 |
| CA | 2120809 | 10/1994 |
| CA | 2099853 | 2/1995 |
| CA | 2108069 | 4/1995 |
| CA | 2105797 | 5/1995 |
| CA | 2132567 | 7/1995 |
| CA | 2123248 | 10/1995 |
| CA | 2125343 | 12/1995 |
| CA | 2169216 | 8/1996 |
| CA | 2162444 | 12/1996 |
| CA | 2160731 | 4/1997 |
| CA | 2164188 | 5/1997 |
| CA | 2200663 | 9/1997 |
| CA | 2180893 | 1/1998 |
| CA | 2190431 | 5/1998 |
| CA | 2096304 | 8/1998 |
| CA | 2228104 | 9/1998 |
| CA | 2202454 | 10/1998 |
| CA | 2223098 | 12/1998 |
| CA | 2086470 | 2/1999 |
| CA | 2238291 | 2/1999 |
| CA | 2244610 | 2/1999 |
| CA | 2262210 | 8/1999 |
| CA | 2272497 | 12/1999 |
| CA | 2289988 | 5/2001 |
| DE | 376009 | 12/1921 |

| | | | | | | |
|---|---|---|---|---|---|---|
| DE | 3238117 | A1 | 6/1983 | WO | WO 82/03789 | 11/1982 |
| EP | 0 172 564 | A2 | 2/1986 | WO | WO 91/08803 | 6/1991 |
| EP | 0 226 420 | A2 | 6/1987 | WO | WO 91/16955 | 11/1991 |
| EP | 0 172 564 | A3 | 10/1987 | WO | WO 90/15712 | 12/1991 |
| EP | 0 226 420 | A3 | 3/1988 | WO | WO 93/05219 | 3/1993 |
| EP | 0 351 201 | A2 | 1/1990 | WO | WO 94/21334 | 9/1994 |
| EP | 0 407 996 | A2 | 1/1991 | WO | WO 94/23768 | 10/1994 |
| EP | 0 441 971 | A1 | 8/1991 | WO | WO 95/01820 | 1/1995 |
| EP | 0 407 996 | A3 | 1/1992 | WO | WO 95/24245 | 9/1995 |
| EP | 0 226 420 | B1 | 8/1992 | WO | WO 96/01137 | 1/1996 |
| EP | 0 523 913 | A1 | 1/1993 | WO | WO 96/01699 | 1/1996 |
| EP | 0 532 444 | A1 | 3/1993 | WO | WO 96/02385 | 2/1996 |
| EP | 0 585 965 | A1 | 3/1994 | WO | WO 96/13549 | 5/1996 |
| EP | 0 597 166 | A2 | 5/1994 | WO | WO 97/03730 | 2/1997 |
| EP | 0 407 996 | B1 | 12/1994 | WO | WO 97/03820 | 2/1997 |
| EP | 0 597 166 | A3 | 2/1995 | WO | WO 97/29808 | 8/1997 |
| EP | 0 662 391 | A2 | 7/1995 | WO | WO 97/33660 | 9/1997 |
| EP | 0 662 391 | A3 | 11/1995 | WO | WO 97/41929 | 11/1997 |
| EP | 0 441 971 | B1 | 2/1996 | WO | WO 98/01189 | 1/1998 |
| EP | 0 523 913 | B1 | 4/1996 | WO | WO 98/19753 | 5/1998 |
| EP | 0 733 469 | A2 | 9/1996 | WO | WO 98/24616 | 6/1998 |
| EP | 0 733 469 | A3 | 11/1996 | WO | WO 98/41292 | 9/1998 |
| EP | 0 742 266 | A2 | 11/1996 | WO | WO 98/55182 | 12/1998 |
| EP | 0 597 166 | B1 | 3/1997 | WO | WO 99/17845 | 4/1999 |
| EP | 0 764 453 | A1 | 3/1997 | WO | WO 99/32198 | 7/1999 |
| EP | 0 487 549 | B1 | 9/1997 | WO | WO 99/60030 | 11/1999 |
| EP | 0 504 230 | B1 | 7/1998 | WO | WO 00/03769 | 1/2000 |
| EP | 0 742 266 | A3 | 1/1999 | WO | WO 00/09222 | 2/2000 |
| EP | 0 927 628 | A1 | 7/1999 | WO | WO 00/10655 | 3/2000 |
| EP | 0 947 562 | A1 | 10/1999 | WO | WO 00/27632 | 5/2000 |
| FI | 65018 | | 11/1983 | WO | WO 00/32278 | 6/2000 |
| GB | 637779 | | 5/1950 | WO | WO 00/46255 | 8/2000 |
| GB | 1121051 | | 7/1968 | | | |
| SE | 169928 | | 10/1959 | | | |

\* cited by examiner

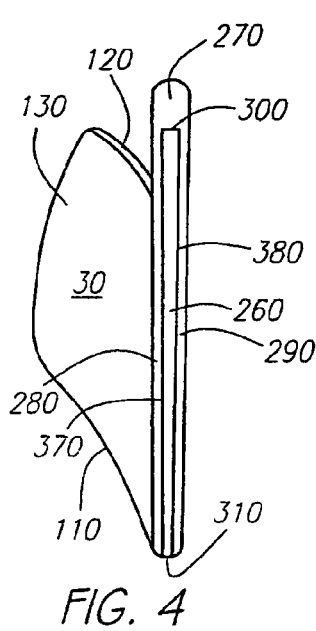
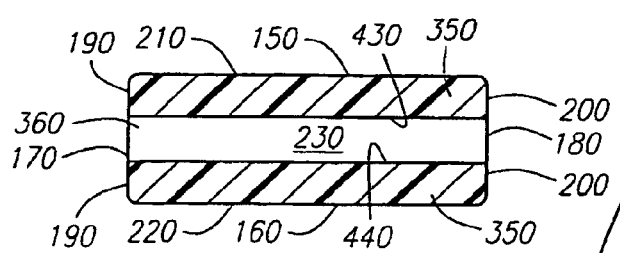
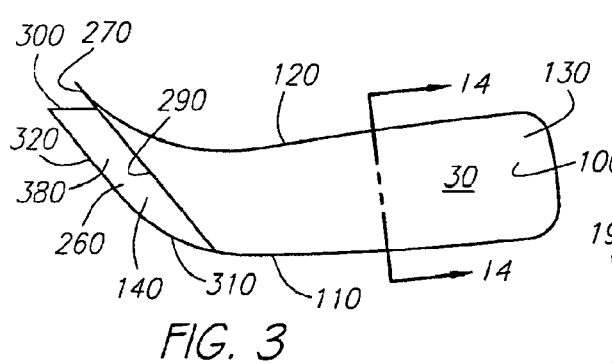
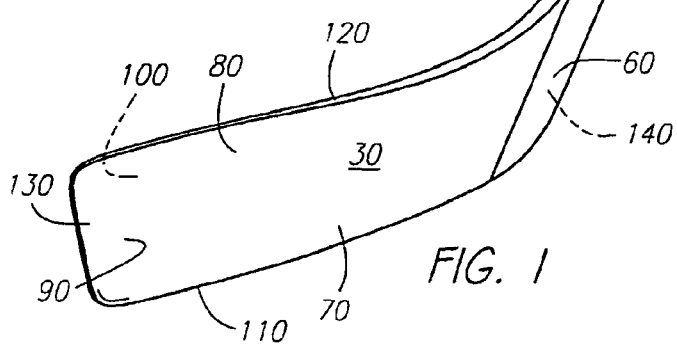
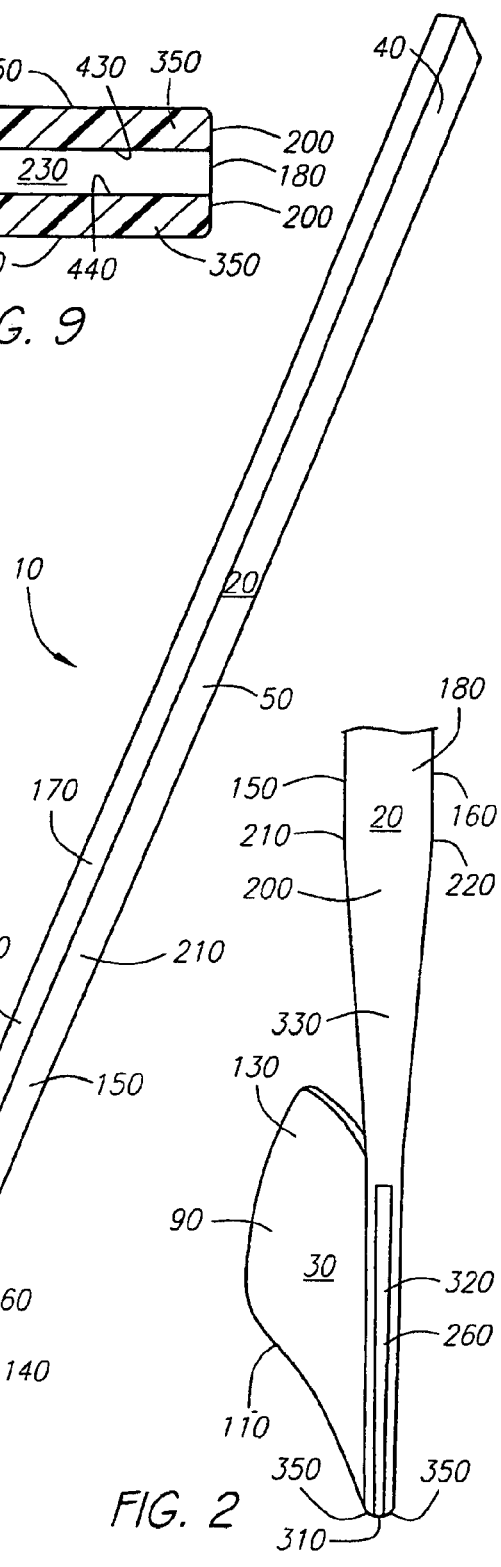

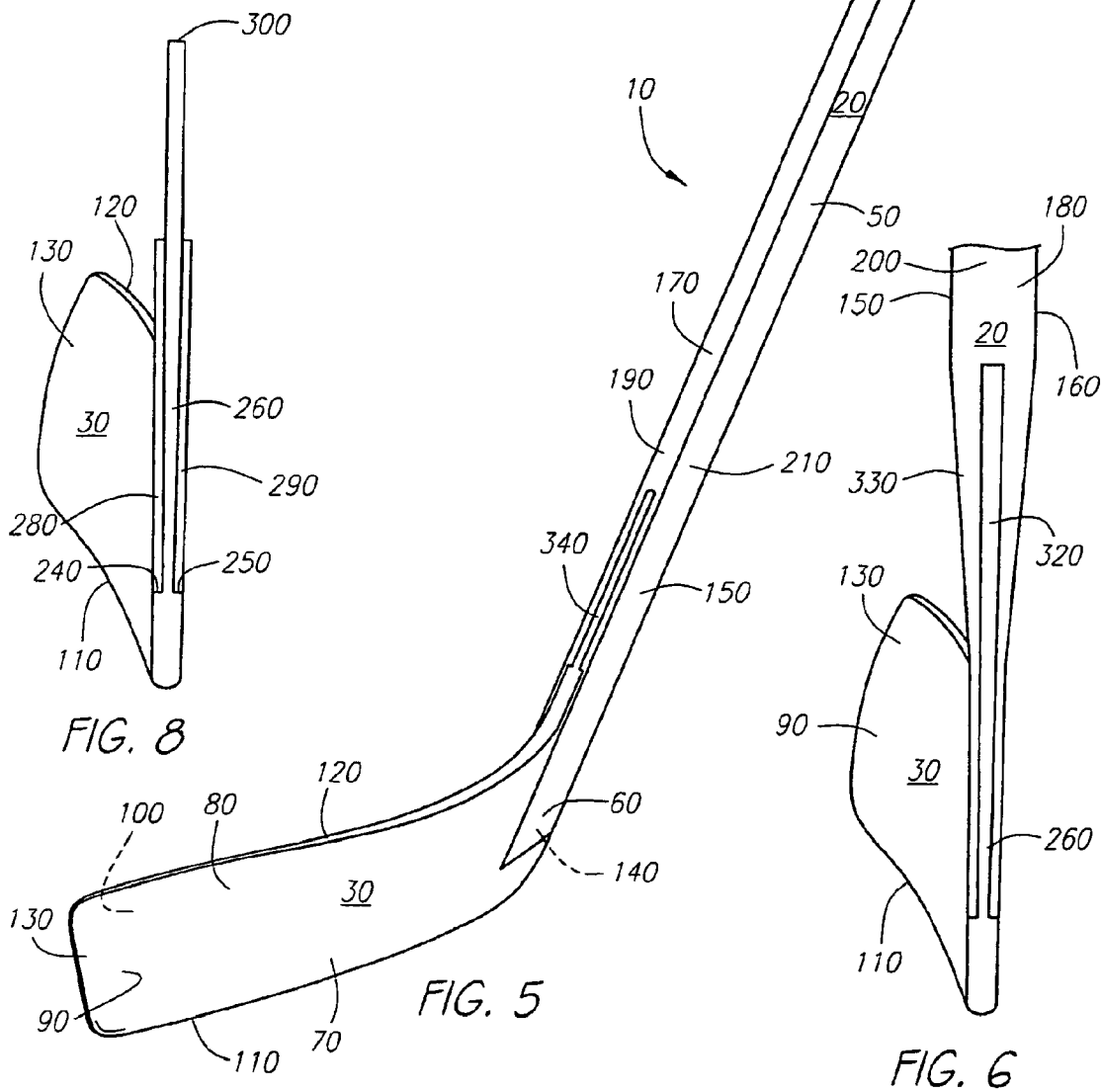

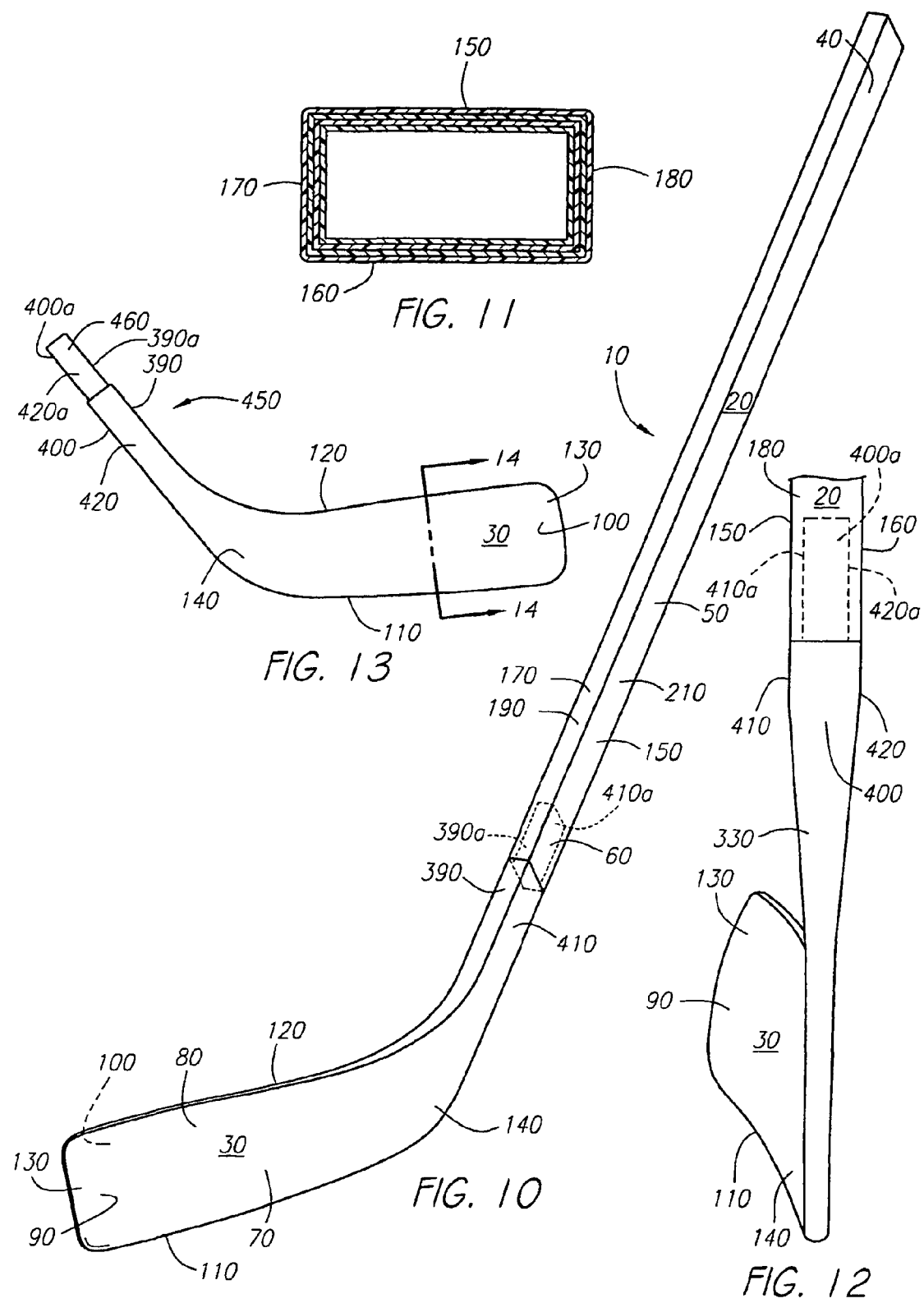

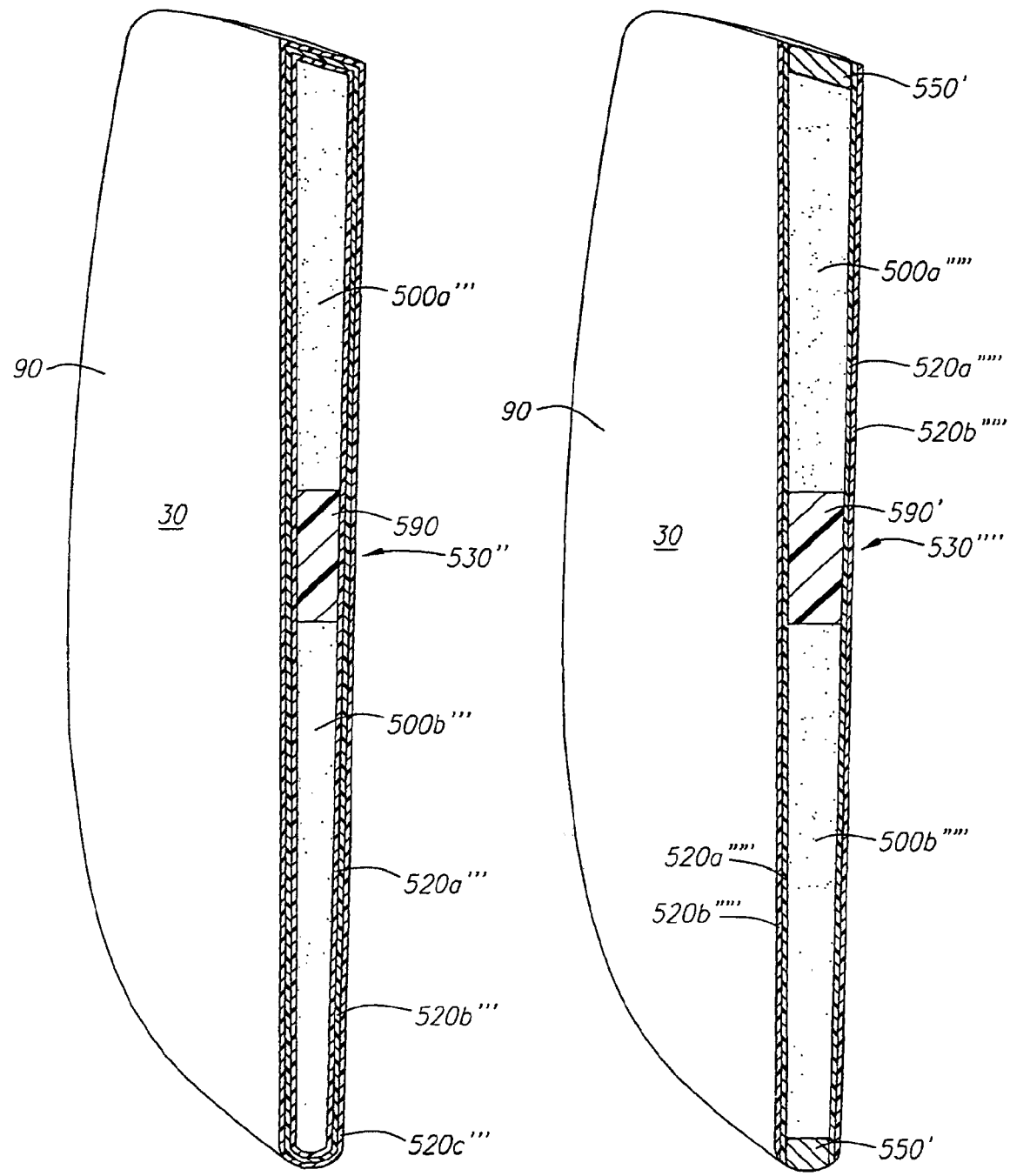

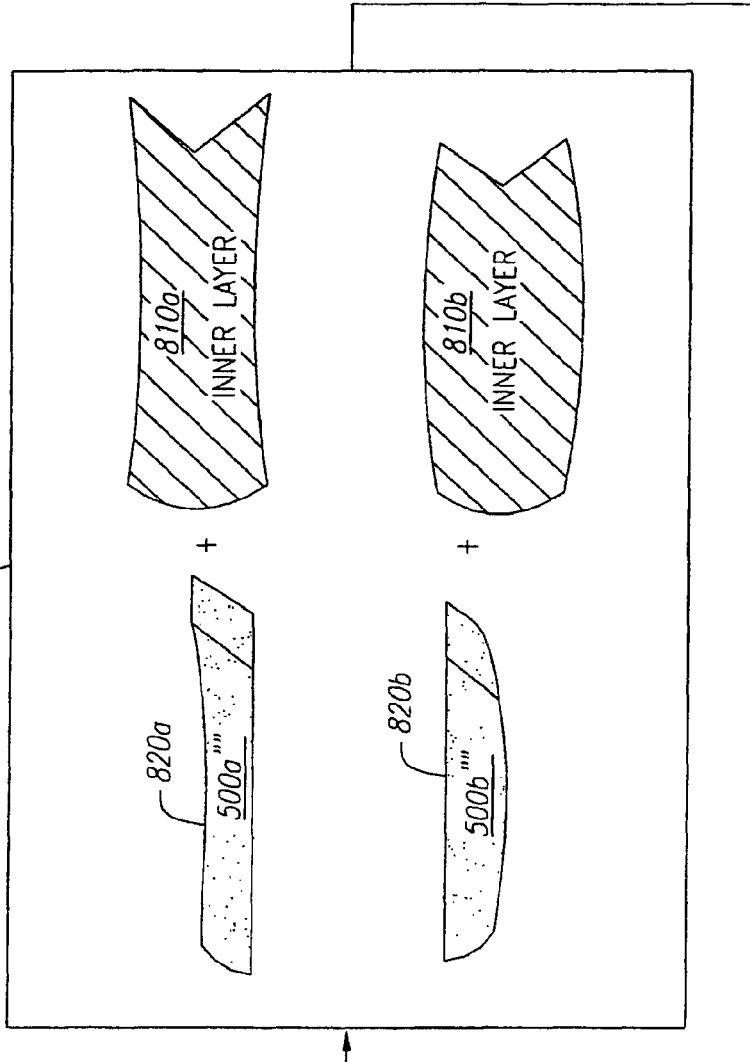
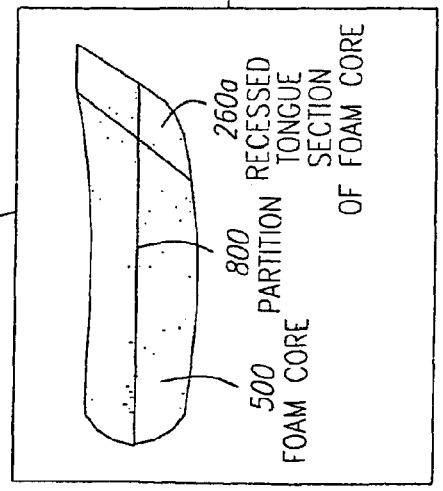

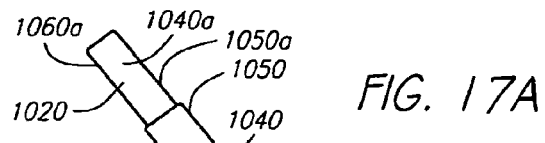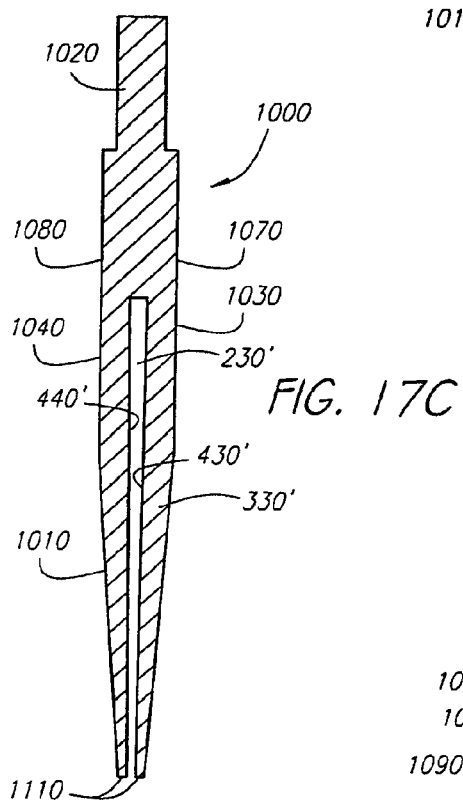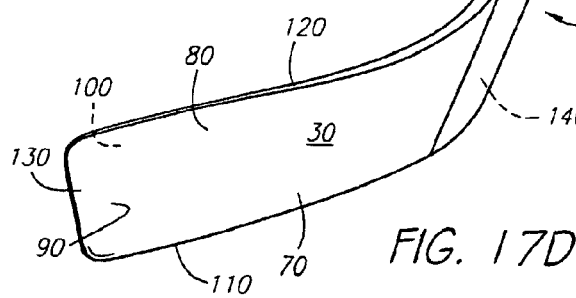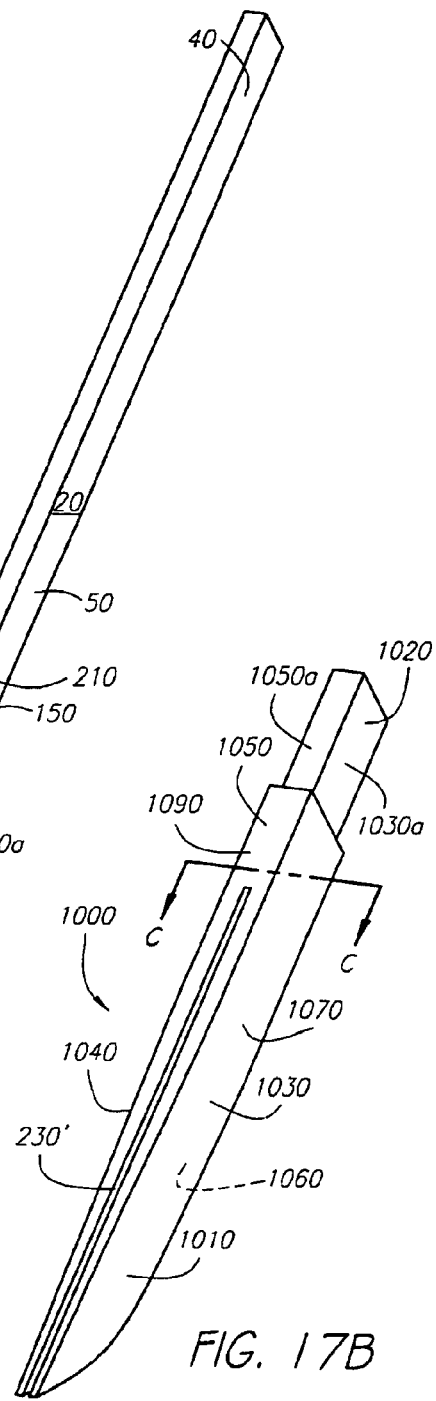

HOCKEY STICK

CROSS REFERENCE TO RELATED APPLICATIONS

This application is a divisional of co-pending U.S. patent application Ser. No. 11/485,642, filed on Jul. 11, 2006, which is a continuation of U.S. patent application Ser. No. 10/826,983, filed on Apr. 16, 2004, issuing as U.S. Pat. No. 7,097,577 on Aug. 29, 2006, which is a continuation of U.S. patent application Ser. No. 10/290,052, filed on Nov. 6, 2002, now abandoned, which is a continuation of U.S. patent application Ser. No. 09/663,598, filed on Sep. 15, 2000, now abandoned. Each of these applications are hereby incorporated in their entirety by reference. This application claims the benefit of priority under 35 U.S.C. §120 to U.S. patent application Ser. No. 11/485,642, filed on Jul. 11, 2006, currently pending; U.S. patent application Ser. No. 10/826,983, filed on Apr. 16, 2004, issued as U.S. Pat. No. 7,097,577 on Aug. 29, 2006; U.S. patent application Ser. No. 10/290,052, filed on Nov. 6, 2002, now abandoned; and U.S. patent application Ser. No. 09/663,598, filed on Sep. 15, 2000, now abandoned.

FIELD OF THE INVENTION

The field of the present invention generally relates to hockey sticks.

BACKGROUND OF THE INVENTION

Generally, hockey sticks are comprised of a blade portion and an elongated shaft portion. Traditionally, each portion was constructed of wood (e.g., solid wood, wood laminates,) and attached together at a permanent joint. The joint generally comprised a slot formed by two opposing sides of the lower end section of the shaft with the slot opening on the forward facing surface of the shaft. As used in this application "forward facing surface of the shaft" means the surface of the shaft that faces generally toward the tip of the blade and is generally perpendicular to the longitudinal length of the blade at the point of attachment. The heel of the blade comprised a recessed portion dimensioned to be receivable within the slot. Upon insertion of the blade into the slot, the opposing sides of the shaft that form the slot overlap the recessed portion of the blade at the heel. The joint was made permanent by application of a suitable bonding material or glue between the shaft and the blade. In addition, the joint was oftentimes further strengthened by an overlay of fiberglass material.

Traditional wood hockey stick constructions, however, are expensive to manufacture due to the cost of suitable wood and the manufacturing processes employed. In addition, due to the wood construction, the weight may be considerable. Moreover, wood sticks lacked durability, often due to fractures in the blade, thus requiring frequent replacement. Furthermore, due to the variables relating to wood construction and manufacturing techniques, wood sticks were often difficult to manufacture to consistent tolerances. For example, the curve and flex of the blade often varied even within the same model and brand of stick. Consequently, a player after becoming accustomed to a particular wood stick was often without a comfortably seamless replacement when the stick was no longer in a useable condition.

Notwithstanding, the "feel" of traditional wood-constructed hockey sticks was found desirable by many players. The "feel" of a hockey stick can vary depending on a myriad of factors including the type of materials employed in construction, the structure of the components, the dimensions of the components, the rigidity or bending stiffness of the shaft and blade, the weight and balance of the shaft and blade, the rigidity and strength of the joint(s) connecting the shaft to the blade, the curvature of the blade, etc. Experienced players and the public are often inclined to use hockey sticks that have a "feel" that is comfortable yet provides the desired performance. Moreover, the subjective nature inherent in this decision often results in one hockey player preferring a certain "feel" of a particular hockey stick while another hockey player preferring the "feel" of another hockey stick.

Perhaps due to the concerns relating to traditional wood hockey stick constructions, contemporary hockey stick design veered away from the traditional permanently attached blade configuration toward a replaceable blade and shaft configuration. The blade portion of these contemporary designs employ a blade connection member that is generally comprised of an upward extension of the blade from the heel often referred to as a "tennon", "shank" or "hosel." The shafts of these contemporary designs generally employ a four-sided tubular member having a connection portion comprising a socket (e.g., the hollow at the end of the tubular shaft). The socket is configured and dimensioned so that it may slidably and snugly receive the connection member of the blade. Thus, the joint generally is comprised of a four-plane lap joint. In order to facilitate the detachable connection between the blade and the shaft and to further strengthen the integrity of the joint, a suitable bonding material or glue is typically employed. Notable in these contemporary replaceable blade and shaft configuration design is that the point of attachment between the blade and the shaft is substantially elevated relative to the heel attachment employed in traditional wood type constructions.

Contemporary replaceable blades, of the type discussed above, are constructed of various materials including wood, wood laminates, wood laminate overlaid with fiberglass, and what is often referred to in the industry as "composite" constructions. Composite constructions generally comprised a core overlaid with plies of woven and substantially continuous fibers, such as carbon, graphite or Kevlar™ disposed within a matrix material. Contemporary replaceable blades, employing such composite constructions, are typically manufactured by employment of a resin transfer molding (RTM) process, generally involving the following steps. First, a plurality of inner core elements composed of compressed foam, such as polyurethane, are individually and together inserted into one or more woven-fiber sleeves to form an uncured blade assembly. The uncured blade assembly including the hosel or connection member is then inserted into a mold having the desired exterior shape of the blade. After the mold is sealed, a suitable matrix material or resin is injected into the mold to impregnate the woven-fiber sleeves. Thus, the resin is transferred into the mold after the blade assembly is fitted in the mold and the mold is sealed. The blade assembly is then cured for the requisite time, removed from the mold and finished. Experience has shown that the employment of the woven-fiber sleeve material together with the step of impregnating the fiber sleeves in the mold involves considerable expense due to the cure time involved and the costs of the woven sleeve materials employed.

Composite blades, nonetheless, are thought to have certain advantages over wood blades. For example, composite blades may be more readily manufactured to consistent tolerances and are generally more durable than wood blades. Moreover, due to the strength that may be achieved via the employment of composite construction, the blades may be made thinner and lighter than wood blades of similar strength and flexibility.

BRIEF SUMMARY OF THE INVENTION

The present invention relates in one aspect to hockey stick blades suitable for use in the sport of hockey and the like.

According to one aspect as described herein, a blade for a hockey stick comprises an elongated member extending from a tip section to a heel section and having a front face and a back face. The heel section comprises front-side and back-side facing surfaces that are recessed relative to adjacent portions of the front and back faces. The elongated member further comprises an inner foam core and one or more plies overlaying the inner foam core, wherein the one or more plies comprise substantially continuous fibers disposed within a matrix material.

According to another aspect, a blade for hockey stick comprises an elongated member extending from a tip section to a heel section and having a front face and a back face. The heel section comprises front-side and back-side facing surfaces that are recessed relative to adjacent portions of the front and back faces. The elongated member further comprises a core of non-continuous random fibers disposed within a matrix material.

According to another aspect, a hockey blade for attachment with a hockey stick shaft comprises an elongated member. The elongated member extends from a tip section to a heel section. The elongated member has a front face and a back face. The elongated member comprises a core of non-continuous random fibers disposed within a matrix material.

The present invention relates in another aspect to hockey sticks suitable for use in the sport of hockey and the like.

According to one aspect as described herein a hockey stick comprises a shaft and a blade connected with the shaft. The blade includes an elongated member extending from a tip section to a heel section and having a front face and a back face. The heel section comprises front-side and back-side facing surfaces that are recessed relative to adjacent portions of the front and back faces. The elongated member further comprises an inner foam core and one or more plies overlaying the inner foam core, wherein the one or more plies comprise substantially continuous fibers disposed within a matrix material.

According to another aspect, the hockey stick comprises a shaft and a blade connected with the shaft. The blade includes an elongated member extending from a tip section to a heel section and having a front face and a back face. The heel section comprises front-side and back-side facing surfaces that are recessed relative to adjacent portions of the front and back faces. The elongated member further comprises a core of non-continuous random fibers disposed within a matrix material.

The present invention relates in another aspect to a hockey stick adapter member for connecting a hockey stick shaft to a hockey stick blade.

According to one aspect as described herein, a hockey stick adapter member for connecting a hockey stick shaft to a hockey stick blade comprises a member extending from a first end section to a second end section and having a forward facing surface, a rearward facing surface, and an end surface. The first end section comprises a slot extending from the forward facing surface toward the rearward facing surface. The second end section is configured to mate with a hockey stick shaft.

The present invention relates in another aspect to methods for manufacturing composite hockey stick blades.

According to one aspect as described herein, a method for manufacturing a composite hockey stick blade comprises the steps of: (a) providing a foam core having the general shape of a hockey stick blade; (b) forming an uncured blade assembly by wrapping the foam core with one or more plies comprising substantially continuous fibers pre-impregnated with a curable matrix material; (c) providing a mold having the desired exterior shape of the blade; (d) loading the mold with the uncured blade assembly; (e) applying heat to the mold to cure the blade assembly; and (f) removing the cured blade assembly from the mold.

According to one aspect as described herein, a method for manufacturing a composite hockey stick blade comprises the steps of: (a) providing a mold having the desired exterior shape of the blade; (b) loading the mold with a mixture of non-continuous fibers disposed in a curable matrix material; (c) applying heat to the mold to cure; and (d) removing the cured blade from the mold.

Additional implementations, features, variations and advantageous of the invention will be set forth in the description that follows, and will be further evident from the illustrations set forth in the accompanying drawings.

BRIEF DESCRIPTION OF THE DRAWINGS

The accompanying drawings illustrate presently preferred embodiments of the invention and, together with the description, serve to explain various principles of the invention.

FIG. 1 is a diagram illustrating a hockey stick in accordance with a first preferred embodiment.

FIG. 2 is a rear view of the hockey stick illustrated in FIG. 1.

FIG. 3 is a back face view of the hockey stick blade illustrated in FIG. 1 detached from the hockey stick shaft.

FIG. 4 is a rear end view of the hockey stick blade illustrated in FIG. 3.

FIG. 5 is a diagram illustrating a hockey stick in accordance with a second preferred embodiment.

FIG. 6 is a rear view of the hockey stick illustrated in FIG. 5.

FIG. 7 is a back face view of the hockey stick blade illustrated in FIG. 5 detached from the hockey stick shaft.

FIG. 8 is a rear end view of the hockey stick blade illustrated in FIG. 7.

FIG. 9 is a bottom end view of the hockey stick shaft illustrated in FIGS. 1 and 5 detached from the blade.

FIG. 10 is a diagram illustrating a hockey stick in accordance with a third preferred embodiment.

FIG. 11 is a bottom end view of the hockey stick shaft illustrated in FIGS. 10 and 12 detached from the blade.

FIG. 12 is a rear view of the hockey stick illustrated in FIG. 10.

FIG. 13 is a back face view of the hockey stick blade illustrated in FIG. 10 detached from the hockey stick shaft.

FIG. 14D is a cross-sectional view taken along line 14-14 of FIGS. 3, 7 and 13 illustrating a fourth preferred construction of the hockey stick blade.

FIG. 14F is a cross-sectional view taken along line 14-14 of FIGS. 3, 7 and 13 illustrating a sixth preferred construction of the hockey stick blade.

FIGS. 16A-C is a flow chart of exemplary graphical representations detailing preferred steps for manufacturing the hockey stick blade illustrated in FIG. 14E.

FIG. 17A is a side view of an adapter member configured to be joined with the hockey stick blade of the type illustrated in FIGS. 3 and 7 and the shaft illustrated in FIGS. 10-12.

FIG. 17B is a perspective view of the adapter member illustrated in FIG. 17A.

FIG. 17C is a cross-sectional view of the adapter member illustrated in FIG. 17B.

FIG. 17D is a diagram illustrating a hockey stick having the adapter member illustrated in FIGS. 17A-17C.

DETAILED DESCRIPTION OF THE INVENTION

Figure 14A:
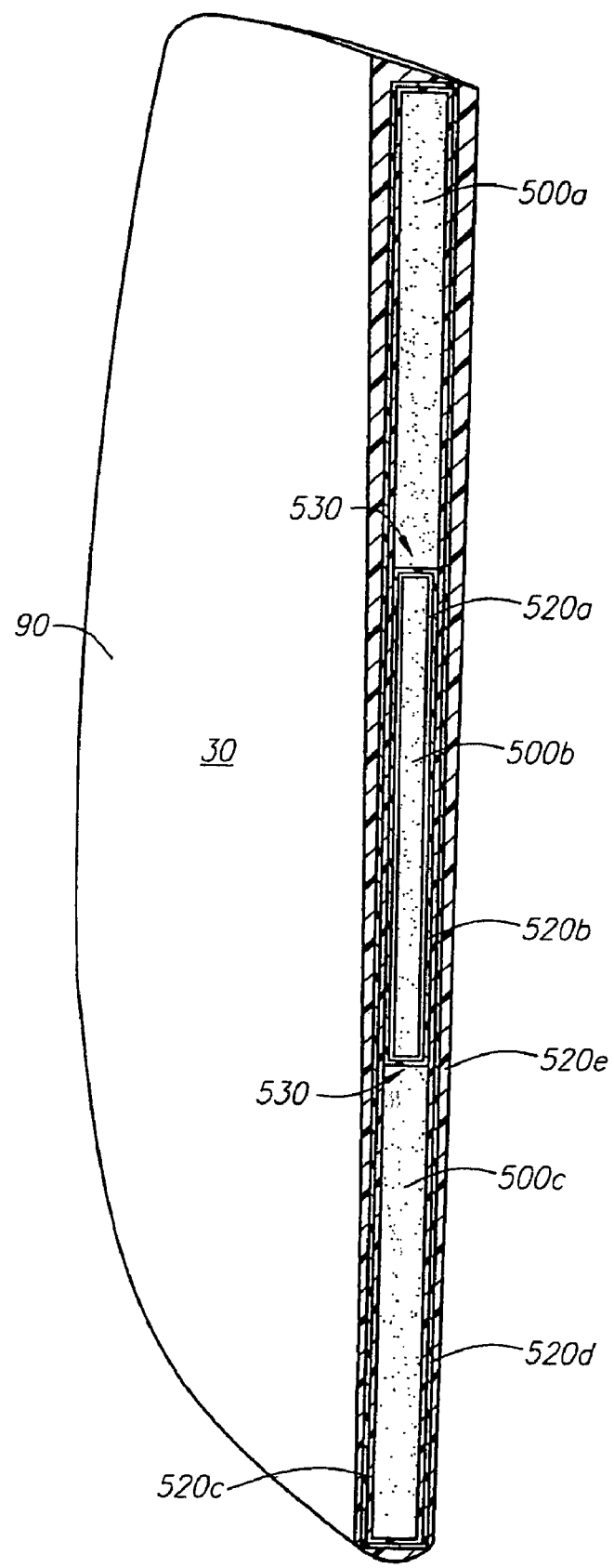
FIG. 14A is a cross-sectional view taken along line 14-14 of FIGS. 3, 7, and 13 illustrating a first preferred construction of the hockey stick blade.

The preferred embodiments will now be described with reference to the drawings. To facilitate description, any reference numeral designating an element in one figure will designate the same element if used in any other figure. The following description of the preferred embodiments is only exemplary. The present invention is not limited to these embodiments, but may be realized by other implementations. Furthermore, in describing preferred embodiments, specific terminology is resorted to for the sake of clarity. However, the invention is not intended to be limited to the specific terms so selected, and it is to be understood that each specific term includes all equivalents.

FIGS. 1-13 and 17 are diagrams illustrating preferred embodiments of a hockey stick 10. Commonly shown in FIGS. 1-13 and 17 is a hockey stick 10 comprised of a shaft 20 and a blade 30. The blade 30 comprises a lower section 70, an upper section 80, a front face 90, a back face 100, a bottom edge 110, a top edge 120, a tip section 130, and a heel section 140. In the preferred embodiment, the heel section 140 generally resides between the plane defined by the top edge 120 and the plane defined by the bottom edge 110 of the blade 30. The shaft 20 comprises an upper section 40, a mid-section 50, and a lower section 60 that is adapted to be joined to the blade 30 or, with respect to the embodiment illustrated in FIG. 17, the adapter member 1000.

The shaft 20 is preferably rectangular in cross-section with two wide opposed walls 150 and 160 and two narrow opposed walls 170 and 180. Narrow wall 170 includes a forward-facing surface 190 and narrow wall 180 includes a rearward-facing surface 200. The forward-facing surface 190 faces generally toward the tip section 130 of the blade 30 and is generally perpendicular to the longitudinal length (i.e., the length between the heel section 140 and the tip section 130) of the blade 30. The rearward-facing surface 200 faces generally away from the tip section 130 of the blade 30 and is also generally perpendicular to the longitudinal length of the blade 30. Wide wall 150 includes a front-facing surface 210 and wide wall 160 includes a back-facing surface 220. The front-facing surface 210 faces generally in the same direction as the front face 90 of the blade 30 and the back-facing surface 220 faces generally in the same direction as the back face 100 of the blade 30.

In the first and second preferred embodiments as illustrated in FIGS. 1-9, the shaft 20 includes a tapered section 330 having a reduced shaft width. The "shaft width" is defined for the purposes of this application as the dimension between the front and back facing surfaces 210 and 220. The tapered section 330 is preferably dimensioned so that when the shaft 20 is joined to the blade 30 the front and back facing surfaces 210, 220 of the shaft 20 are generally flush with the adjacent portions of the front and back faces 90 and 100 of the blade 30. The lower section 60 of the shaft 20 includes an open-ended slot 230 (best illustrated in FIG. 9) that extends from the forward-facing surface 190 of narrow wall 170 preferably through the rearward-facing surface 200 of narrow wall 180. As best illustrated in FIG. 9, the slot 230 also extends through the end surface 350 of the shaft 20. The slot 230 is dimensioned to receive, preferably slidably, a recessed or tongue portion 260 located at the heel section 140 of the blade 30.

As best illustrated in FIGS. 3-4 and 7-8, the transition between the tongue portion 260 and an adjacent portion of the blade 30 extending toward the tip section 130 forms a front-side shoulder 280 and a back-side shoulder 290, each of which generally face away from the tip section 130 of the blade 30. When the tongue portion 260 is joined to the shaft 20 via the slot 230 the forward facing surface 190 of the shaft 20 on either side of the slot 230 opposes and preferably abuts with shoulders 280 and 290. Thus, the joint formed is similar to an open slot mortise and tongue joint. The joint may be made permanent by use of adhesive such as epoxy, polyester, methacrolates (e.g., Plexus™ or any other suitable material. Applicants have found that Plexus™ is suitable for this application. In addition, as in the traditional wood construction, the joint may be additionally strengthened after the blade and shaft are joined by an overlay of fiberglass or other suitable material over the shaft and blade.

As illustrated in FIGS. 1-4 and 9 of the first preferred embodiment, the tongue portion 260 comprises an upper edge 300, a lower edge 310, and a rearward-facing edge 320. The blade 30 preferably includes an upper shoulder 270 that extends from the upper edge 300 of the tongue portion 260 upwardly away from the heel section 140. When the tongue portion 260 is joined within the slot 230, the forward-facing surface 190 of the shaft 200 located directly above the top of the slot 230 opposes and preferably abuts with the upper shoulder 270 of the blade 30; the rearward-facing edge 320 of the tongue 260 is preferably flush with the rearward-facing surface 200 of the shaft 20 on either side of the slot 230; the lower edge 310 of the tongue 260 is preferably flush with the end surface 350 of the shaft 20 the upper edge 300 of the tongue 260 opposes and preferably abuts with the top surface 360 of the slot 230; and the front and back side surfaces 370, 380 of the tongue 260 oppose and preferably abut with the inner sides 430, 440 of the wide opposed walls 150, 160 that define the slot 230.

As illustrated in FIGS. 5-9 of the second preferred embodiment, the tongue portion 260 extends upwardly from the heel section 140 beyond the top edge 120 of the blade 30 and is comprised of an upper edge 300, a rearward-facing edge 320, and a forward-facing edge 340. The blade 30 includes a second set of front and back-side shoulders 240 and 250 that border the bottom of the tongue 260 and preferably face generally upward away from the bottom edge 110 of the blade 30. When the tongue portion 260 is received within the slot 230, the end surface 350 of the shaft 20 on either side of the slot opposes and preferably abuts with shoulders 240 and 250;

the rearward-facing edge 320 of the tongue 260 is preferably flush with the rearward-facing surface 200 of the shaft 20 on either side of the slot 230; the forward-facing edge 340 of the tongue 260 is preferably flush with the forward-facing surface 190 of the shaft 20 on either side of the slot 230; the upper edge 300 of the tongue 260 opposes and preferably abuts with the top surface 360 of the slot 230; and the front and back side surfaces 370, 380 of the tongue 260 oppose and preferably abut with the inner sides 430, 440 of the wide opposed walls 150, 160 that define the slot 230.

Illustrated in FIGS. 10-13 is a third preferred embodiment of a hockey stick 10. As best shown in FIG. 11 the shaft 20 is preferably comprised of a hollow tubular member preferably having a rectangular cross-sectional area throughout the longitudinal length of the shaft 20. The blade 30 includes an extended member or hosel portion 450 preferably comprised of two sets of opposed walls 390, 400 and 410, 420 and a mating section 460. The mating section 460 in a preferred embodiment is comprised of a rectangular cross section (also having two sets of opposed walls 390a, 400a, and 410a, 420a) that is adapted to mate with the lower section 60 of the shaft 20 in a four-plane lap joint along the inside of walls 150, 160, 170, and 180. The outside diameter of the rectangular cross-sectional area of the mating section 460 is preferably dimensioned to make a sliding fit inside the hollow center of the lower section 60 of the shaft 20. It is also preferable that the mating section 460 is dimensioned to make a sliding and snug fit inside the hollow center of the lower section 60 of the shaft 20. Preferably, the blade 30 and shaft 20 are bonded together at the four-plane lap joint using an adhesive capable of removably cementing the blade 30 to shaft 20. Such adhesives are commonly known and employed in the industry and include Z-Waxx™ manufactured by Easton Sports and hot melt glues.

FIGS. 14A through 14G are cross-sectional views taken along line 14-14 of FIGS. 3, 7, and 13 illustrating preferred constructions of the hockey stick blade 30. FIGS. 14A through 14F illustrate constructions that employ an inner foam core 500 overlaid with one or more layers 510 comprising one or more plies 520 of substantially continuous fibers disposed in a matrix or resin based material.

The foam core 500 may be constructed of formulations of expanding syntactic or non-syntactic foam such as polyurethane, PVC, epoxy, or any other suitable material capable of providing the needed pressure (i.e., expansion during heating) in the mold while having a suitable or desired weight or density. Applicants have found that polyurethane foam, manufactured by Burton Corporation of San Diego, Calif. is suitable for such applications.

The fibers employed in plies 520 may be comprised of carbon fiber, aramid (such as Kevlar™ manufactured by Dupont Corporation), glass, polyethylene (such as Spectra™ manufactured by Allied Signal Corporation), ceramic (such as Nextel™ manufactured by 3m Corporation), boron, quartz, polyester or any other fiber that may provide the desired strength. Preferably, at least part of one of the fibers is selected from the group consisting of carbon fiber, aramid, glass, polyethylene, ceramic, boron, quartz, and polyester; even more preferably from the group consisting of carbon fiber, aramid, glass, polyethylene, ceramic, boron, and quartz; yet even more preferably from the group consisting of carbon fiber, aramid, glass, polyethylene, ceramic, and boron; yet even more preferably from the group consisting of carbon fiber, aramid, glass, polyethylene, and ceramic; yet even more preferably from the group consisting of carbon fiber, aramid, glass, and polyethylene; yet even more preferably from the group consisting of carbon fiber, aramid, and glass; yet even more preferably from the group consisting of carbon fiber and aramid; and most preferably comprises carbon fiber.

The matrix or resin based material is selected from a group of resin based materials, including thermoplastics such as polyetherether-ketone, polyphenylene sulfide, polyethylene, polypropylene, urethanes (thermoplastic), and Nylon-6 and thermosets such as urethanes (thermosetting), epoxy, vinylester, polycyanate, and polyester. In order to avoid manufacturing expenses relating to transferring the resin into the mold after the foam-fiber layers are inserted into the mold, the matrix material employed is preferably pre-impregnated into the plies 520 prior to the uncured blade assembly being inserted into the mold and the mold being sealed. In addition, in order to avoid costs associated with the woven sleeve materials employed in contemporary composite blade constructs, it is preferable that the layers be comprised of one or more plies 520 of non-woven uni-directional fibers.

As used herein the term "ply" shall mean "a group of fibers which all run in a single direction, largely parallel to one another, and which may or may not be interwoven with or stitched to one or more other groups of fibers each of which may be or may not be disposed in a different direction." A "layer" shall mean one or more plies that are laid down together.

Applicants have found that a suitable material includes unidirectional carbon fiber tape pre-impregnated with epoxy, manufactured by Hexcel Corporation of Salt Lake City, Utah, and also S & P Systems of San Diego, Calif. Another suitable material includes unidirectional glass fiber tape pre-impregnated with epoxy, also manufactured by Hexcel Corporation. Yet another suitable material includes uni-directional Kevlar™ fiber tape pre-impregnated with epoxy, also manufactured by Hexcel Corporation.

Figures 14B, 14C:
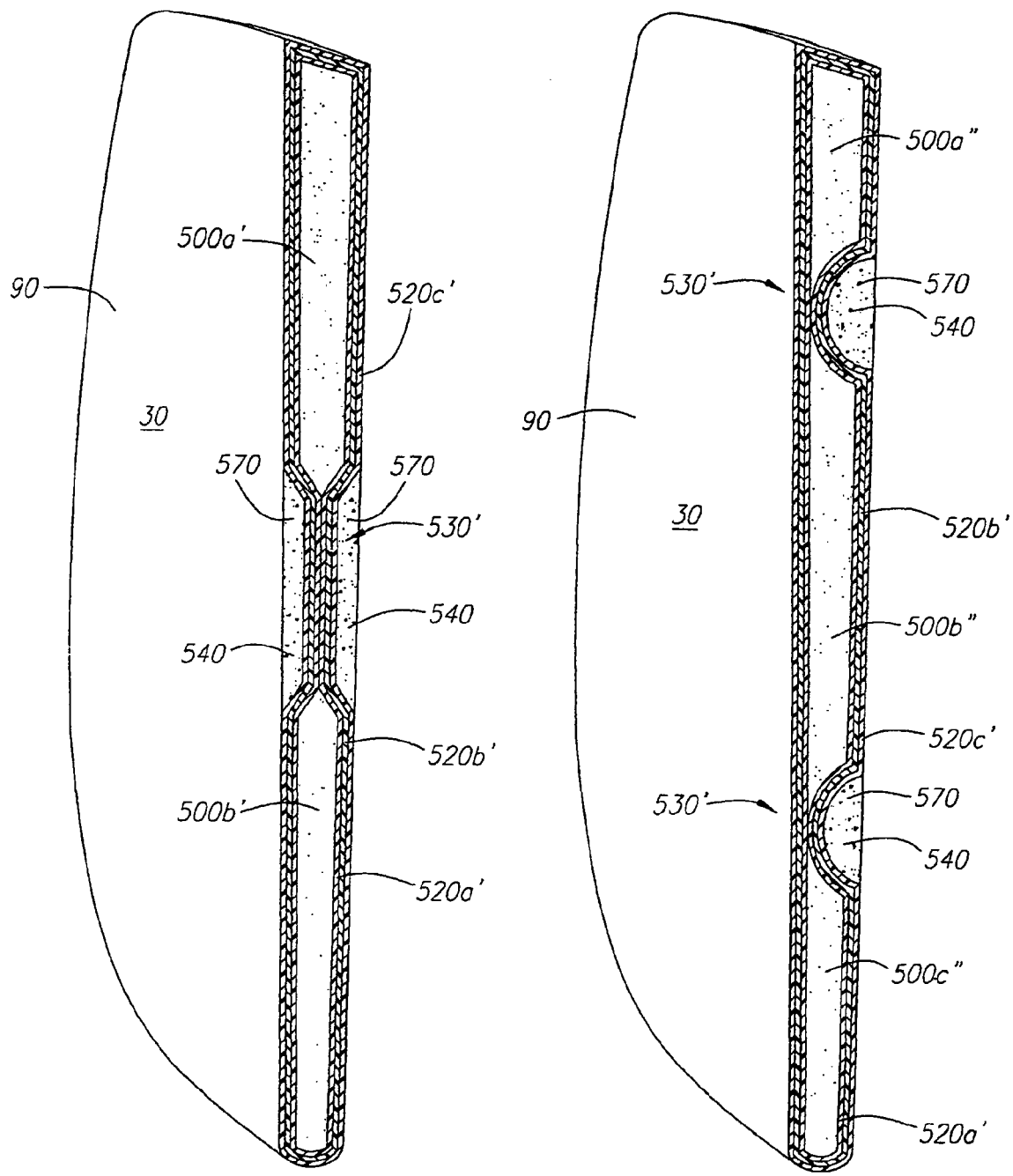
FIG. 14B is a cross-sectional view taken along line 14-14 of FIGS. 3, 7, and 13 illustrating a second preferred construction of the hockey stick blade.
FIG. 14C is a cross-sectional view taken along line 14-14 of FIGS. 3, 7 and 13 illustrating a third preferred construction of the hockey stick blade.
Figures 14E, 14G:
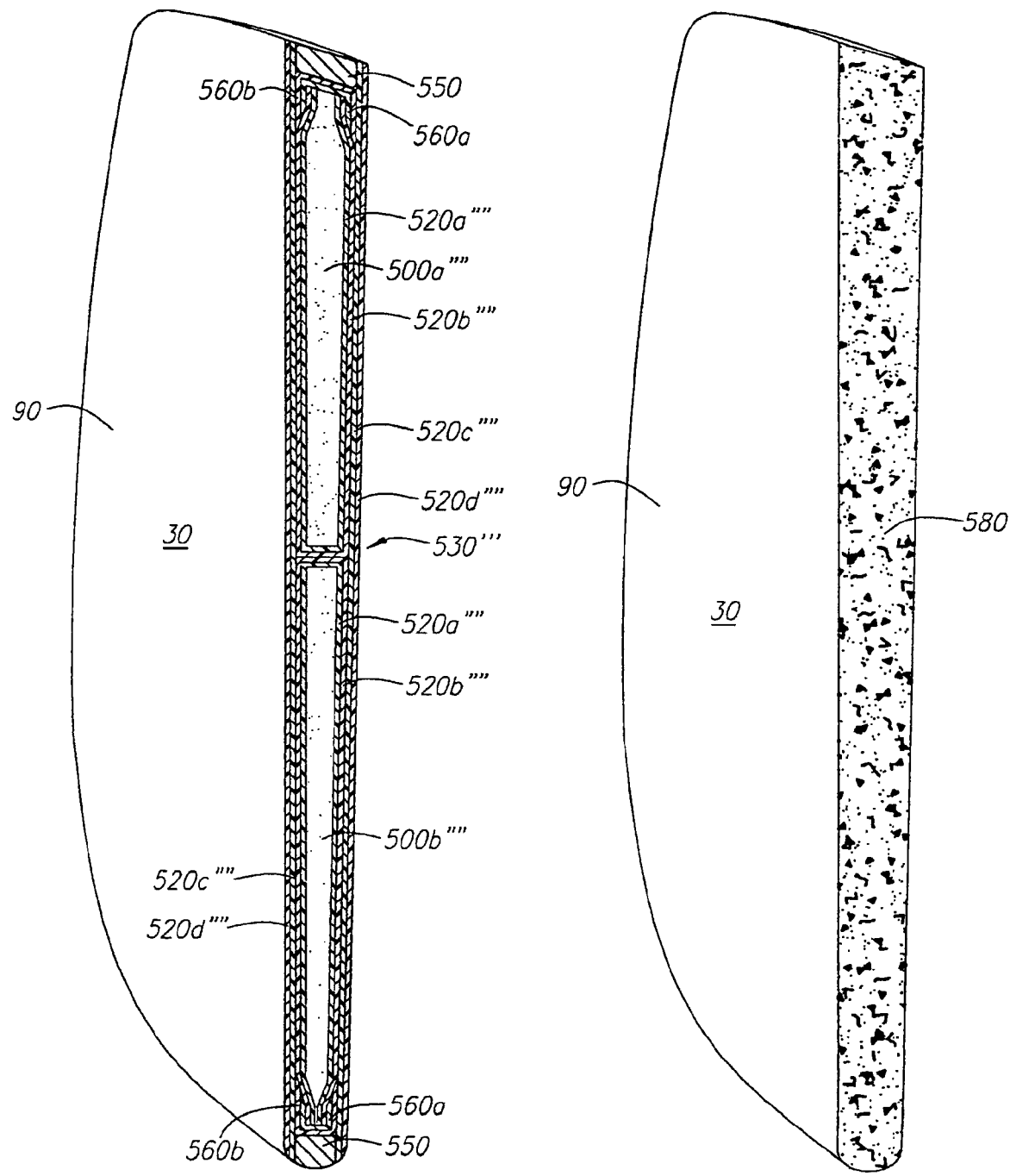
FIG. 14E is a cross-sectional view taken along line 14-14 of FIGS. 3, 7 and 13 illustrating a fifth preferred construction of the hockey stick blade.
FIG. 14G is a cross-sectional view taken along line 14-14 of FIGS. 3, 7 and 13 illustrating a seventh preferred construction of the hockey stick blade.
Figures 15A, 15B:
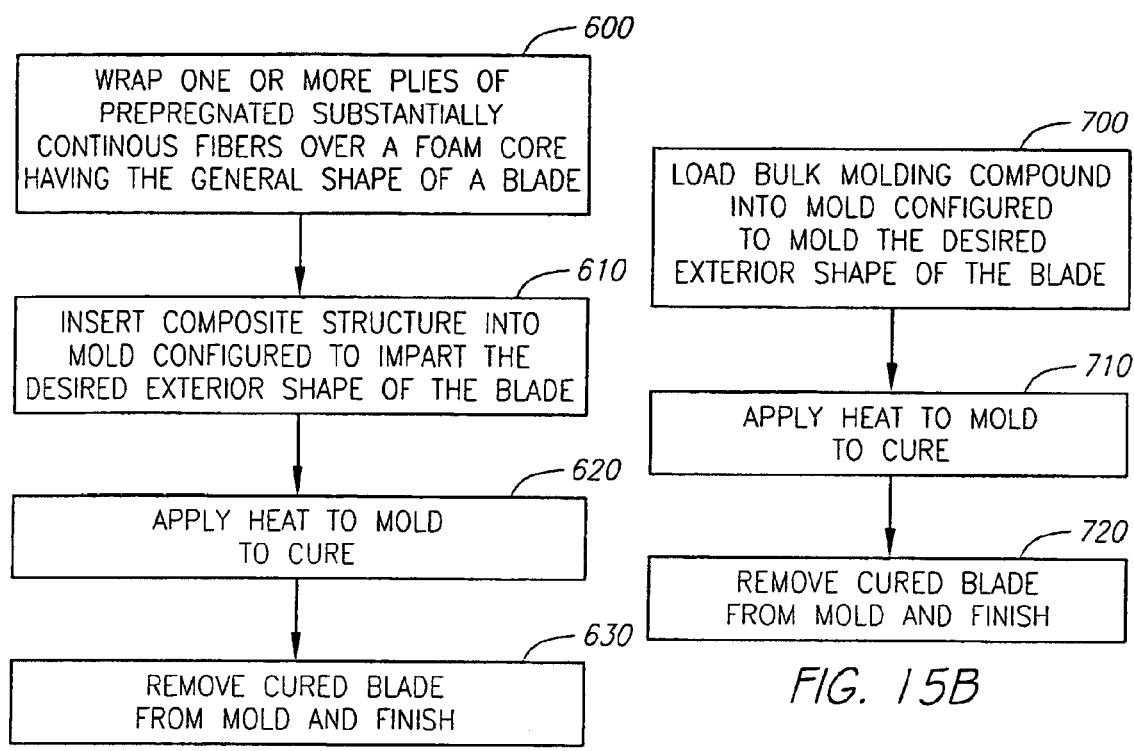
FIG. 15A is a flow chart detailing preferred steps for manufacturing the hockey stick blade illustrated in FIGS. 14A through 14F.
FIG. 15B is a flow chart detailing preferred steps for manufacturing the hockey stick blade illustrated in FIG. 14G.

With reference to FIG. 15A, the blade 30 constructions illustrated in FIGS. 14A through 14F are generally constructed in accordance with the following preferred steps. First, one or more plies 520 of pre-impregnated substantially continuous fibers are wrapped over a foam core 500 that is generally in the shape of the blade 30 illustrated in FIG. 3, 7, or 13 (step 600) to create an un-cured blade assembly. It has been found preferable that each uni-directional fiber ply be oriented so that the fibers run in a different and preferably a perpendicular direction from the underlying uni-directional ply. In the preferred embodiments each ply is oriented so that the fibers run at preferably between +/−30 to 80 degrees relative to the longitudinal length of the blade 30 (i.e., the length from the heel section 140 to the tip section 130), and more preferably between +/−40 to 60 degrees, yet more preferably between +/−40 to 50 degrees, even more preferably between 42.5 and 47.5 degrees, and most preferably at substantially +1−45 degrees. Other ply orientations may also be included, for example it has been found preferable that an intermediate zero degree oriented ply be included between one or more of the plies 520 to provide additional longitudinal stiffness to the blade 30 or for example a woven outer ply (made of e.g., Kevlar™, glass, or graphite) might be included to provide additional strength or to provide desired aesthetics. Furthermore, it is to be understood that additional plies may be placed at discrete locations on the blade 30 to provide additional strength or rigidity thereto. For example, it is contemplated that additional plies be placed at or around the general area where the puck typically contacts the blade 30 during high impact shots such as a slap shot.

Once the uncured blade assembly is prepared the uncured composite structure is inserted into a mold that is configured to impart the desired exterior shape of the blade 30 and the mold is sealed (step 610 of FIG. 15A). Heat is then applied to the mold to cure the blade assembly (step 620 of FIG. 15A). The blade 30 is then removed from the mold and finished to the desired appearance (step 630 of FIG. 15A). The finishing process may include aesthetic aspects such as paint or polishing and also may include structural modifications such as deburring. Once the blade 30 is finished, the blade 30 is then ready for attachment to the shaft 20.

As shown in preferred embodiment FIG. 14A, a three-piece foam core 500a, 500b and 500c is employed. Overlaying the centrally positioned foam core element 500b are two plies 520a and 520b. In application, plies 520a and 520b may be wrapped around core element 500b as a single layer 510. Once plies 520a and 520b are wrapped around the foam core element 500b, plies 520c, 520d, and 520e are wrapped over plies 520a and 520b and around core elements 500a and 500e as illustrated in FIG. 14A. The uncured blade assembly is then inserted into a suitable mold configured to impart the desired exterior shape of the blade 30 as previously discussed in relation to step 610 of FIG. 15A. Once cured, plies 520a and 520b create internal bridge structures 530 that extend from one side of the blade 30 to the other (i.e., from the inner facing surface of ply 520c to the other side inner facing surface of ply 520c on the other side of the blade 30) and thereby may provide additional internal strength or impact resistance to the blade 30.

The internal bridge structure 530 previously referenced in relation to FIG. 14A and also illustrated and discussed in relation to FIGS. 14B through 14F may only extend along a desired discrete portion of the longitudinal length (i.e., the length from the heel to the tip section) of the blade 30. However, it is preferable that the internal bridge structure(s) extend into the recessed or tongue portion 260 of the heel 140 of the blade 30 so additional strength may be imparted at the joint between the blade 30 and the shaft 20. Moreover, by extending the internal bridge structure(s) into the tongue 260 of the blade 30 a potentially more desirable blade 30 flex may be achieved.

Shown in FIGS. 14B and 14C are second and third preferred constructions of the blade 30, each of which also comprises a plurality of inner core elements 500a', 500b' and 500a", 500b", 500c", respectively. Three plies 520a', 520b', and 520c' overlay the foam core elements. The positions of the interface or close proximity of the plies 520 on opposite sides of the blade 30 (i.e., positions where opposed sides of ply 520a', 520b', and 520c' are positioned in close proximity towards one another so that preferably opposed sides of ply 520a' are touching one another) form internal bridge structure(s) 530' interposed between the core elements. The function and preferred position of the internal bridge structure(s) 530' are as previously noted with respect to the bridge structure 530 discussed in relation to FIG. 14A.

In application, the bridge structure(s) 530' illustrated in FIGS. 14B and 14C can be implemented by the following process. First, a single foam core 500, having generally the shape of the blade 30, is provided and wrapped with plies 520a', 520b', and 520c' to create an uncured blade assembly (step 600 of FIG. 15A). The blade assembly is then inserted into a mold having a convex surfaces configured to impart the desired bridge structure 530' into the blade 30 (step 610 of FIG. 15A). The convex surfaces force the foam core structure out of the defined bridge structure region and create a bias that urges the internal sides of the plies towards one another at that defined region. The convex surface(s) may be integral with the mold or may be created by insertion of a suitable material, such as expanding silicone. into the mold at the desired location(s).

Thus, in a preferred application a single foam core 500 is partitioned during the molding process to create the discrete foam core elements. Such a manufacturing process reduces the costs and expenditures related with the manufacturing of a multi-piece foam core structure as well as the time associated with wrapping the plies about such a foam structure as was described in relation to the foam core element 500b of FIG. 14A. In order to create a more desirable blade surface configuration after the blade assembly is cured, the cavities 540 formed by this process may be filled by a suitable filler material 570 such as fiberglass, urethane, epoxy, ABS, styrene, polystyrene, resin or any other suitable material to effectuate the desired outer surface and performance results. Filling the cavities 540 with urethane for example may assist in gripping the puck.

Shown in FIG. 14D is a fourth preferred construction of the blade 30 which also comprises a plurality of inner core elements 500a''' and 500b''' overlaid with three plies 520a''', 520b''', and 520c'''. Extending between the inner core elements 500a''' and 500b''' is bead 590 of preferably pre-impregnated fiber material, such as carbon or glass fiber. A preferred construction process includes the following steps. First, foam core element 500 generally having the shape of blade 30 is provided and a cavity is imparted, preferably by mechanical means, within the foam core element 500 along a portion of its longitudinal length (i.e., generally from the heel section to the toe section) so as to define core elements 500a''' and 500b'''. Alternatively, the foam core element 500 may be molded to include the cavity, thus avoiding the costs associated with mechanical formation of the cavity into the form core element 500. As previously noted in relation to internal bridge structure 530 of FIG. 14A, the bead 590 preferably extends longitudinally into the tongue 260 of the blade 30 so that it may provide additional strength at the joint between the shaft 20 and the blade 30. The cavity is filled with a bead of preferably pre-impregnated fibers. The fiber bead may be comprised of a single layer of substantially continuous pre-impregnated fibers that are rolled or layered to achieve the desired dimensions to fill the cavity. Alternatively. the bead may be comprised of a non-continuous fiber and resin mixture referred to in the industry as "bulk molding compound." The fibers in the bulk molding compound may be selected from the group of fibers previously identified with respect to the substantially continuous fibers employed in plies 520. Once the bead of fiber material is laid in the cavity between core elements 500a''' and 500b''', plies 520a''', 520b''', and 520c''' are wrapped around the foam core elements as illustrated in FIG. 14D to form a uncured blade assembly (step 600 of FIG. 15A). The uncured blade assembly then is inserted into a mold having the desired exterior shape of the blade 30 (step 620 of FIG. 15A) and heat is applied to the mold to cure (step 630 of FIG. 15B). The bead 590 of fiber material forms an internal bridge structure 530" between opposing sides of the blade 30 and is disposed between the core elements 500a''' and 500b''', the function of which is as previously noted in relation to the bridge structure 530 discussed in relation to FIG. 14A.

Figure 16B:
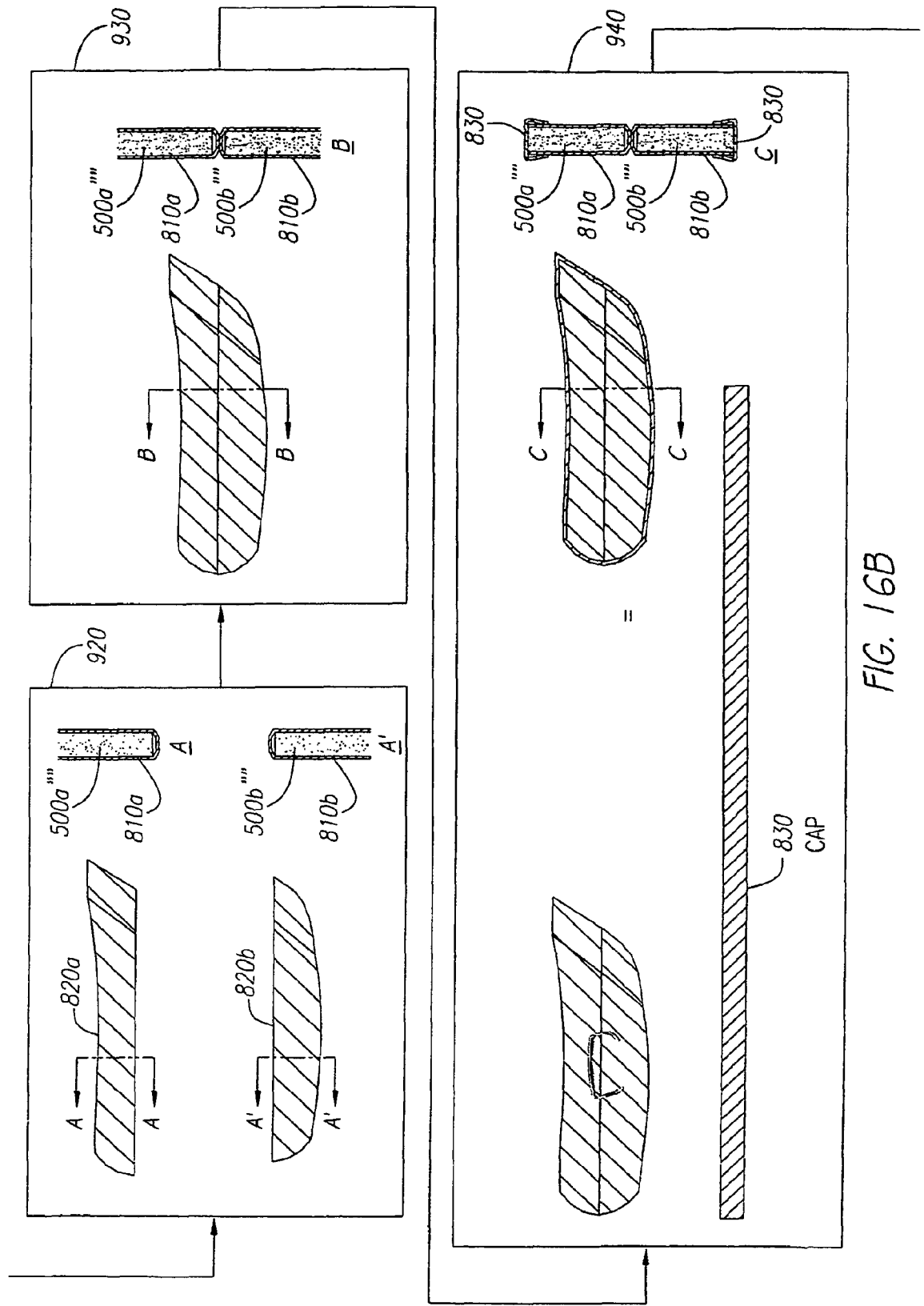

Shown in FIG. 14E is a fifth preferred construction of the hockey stick blade 30. In addition to the preferred steps set forth in FIG. 15A, a preferred process for manufacturing this preferred construction is set forth in more detail in FIGS. 16A-C. With reference to FIG. 14E the preferred steps described and illustrated in FIGS. 16A-C (steps 900 through 960) will now be discussed. First as illustrated in FIG. 16A, a foam core 500 is provided and is preferably configured to include a recessed tongue section 260a' at the heel section 140 of the blade 30 (step 900). The foam core 500 may preferably be molded to have a partition 800 that generally extends the longitudinal length of the blade 30 from the tip section 130 to the heel section 140. Alternatively, it may be preferable that the partition 800 be mechanically imparted to a unitary foam core structure 500.

The foam core 500 is then separated along partition line 800 into foam core elements 500a"" and 500b"" and a inner layers 810a and 810b are provided (step 910). As illustrated in step 910 the inner layers 810a and 810b are preferably dimensioned so that when they are wrapped around the respective core elements 500a"" and 500b"" they extend to the respective upper edges 820a and 820b of the foam core 500a"" and 500b"" (step 920 of FIG. 16B). With reference to FIG. 14E, each layer 810a and 810b is preferably comprised of two plies 520a"" and 520b"".

Layers 810a and 810b at the partition 800 are then mated together so that layers 810a and 810b are interposed within the partition 800 (step 930). Preferably, this may be achieved by touching the mating surfaces of layers 810a and 810b to a hot plate or hot pad to heat the resin pre-impregnated in the plies 520a"" of the outer layers 810a and 810b and thereby facilitate adhesion of the layers 810a and 810b to one another.

A cap layer 830 is preferably provided and wrapped around the circumference of the blade assembly (step 940). The cap layer 830 is preferably dimensioned so that its length is sufficient to completely circumference the outer edges of the foam core elements 500a"" and 500b"" when mated together at the partition 800 as described in relation to step 930. In addition as best illustrated in step 940 and FIG. 14F, the width of the cap layer 830 is dimensioned so that when the cap layer 830 is wrapped around the circumference of the foam core elements 500a"" and 500b"", the cap layer 830 overlaps the outer surfaces of layers 810a and 810b. As best illustrated in FIG. 14E the cap layer 830 is preferably comprised of two plies, 560a and 560b.

Figure 16C:
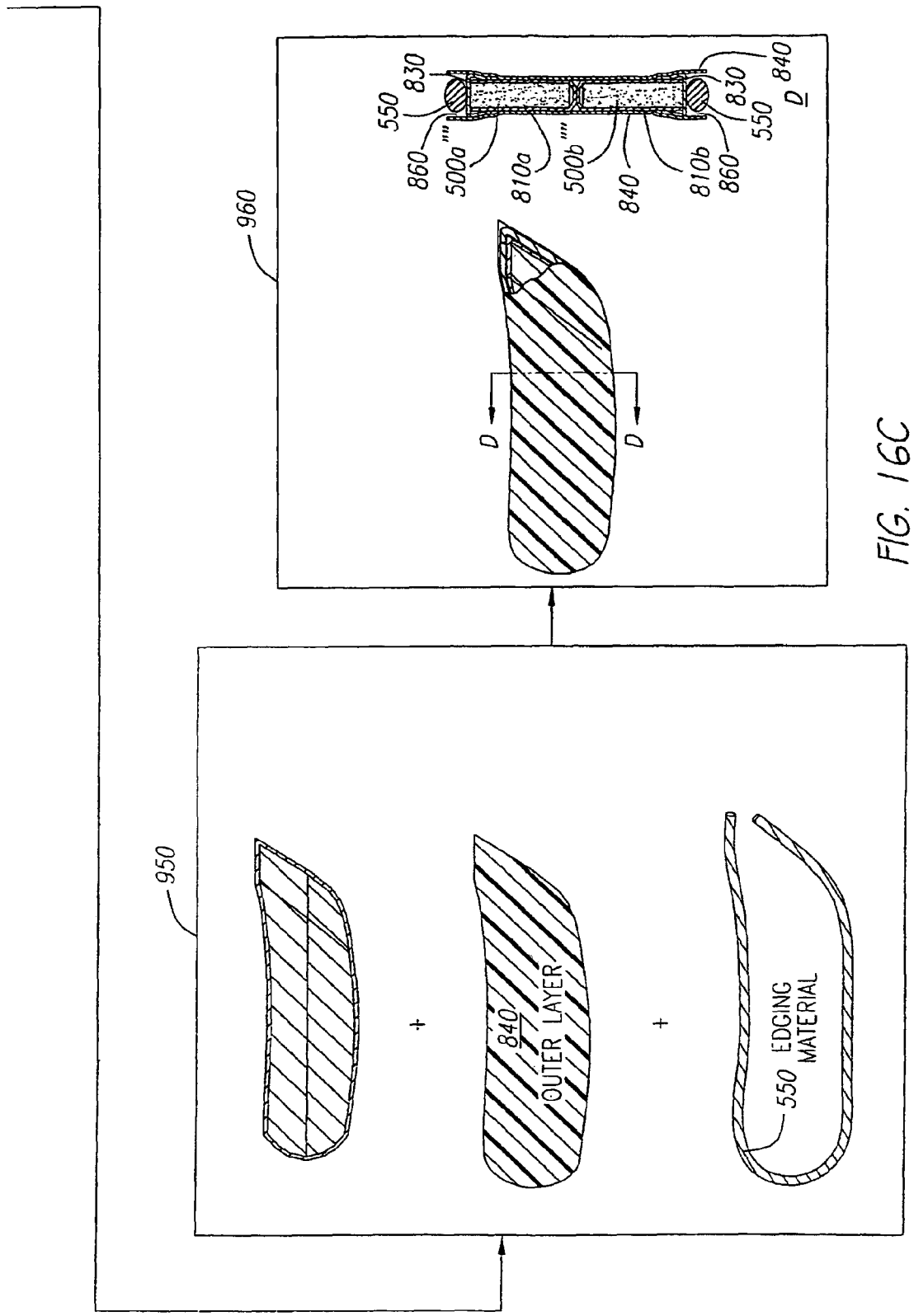

As illustrated in step 950 of FIG. 16C outer layers 840 (only a single outer layer 840 is illustrated in step 950) and an edging material 550 is provided. The edging material is preferably twine or rope and may be comprised of a variety of materials suitable for providing sufficient durability to the edge of the blade 30, such as bulk molding compound of the type previously described, fiberglass, epoxy, resin or any other suitable material. It has been found preferable, however, that fiberglass twine or rope be employed, such as the type manufactured by A & P Technology, Inc. of Cincinnati, Ohio. Each of the outer layers 840, as best-illustrated in FIG. 14E, are also preferably comprised of two plies 520c"" and 520d"". The outer layers 840 are preferably dimensioned to be slightly larger than the foam core elements 500a"" and 500b"" when mated together as described in step 940.

As described and illustrated in step 960, the outer layers 840 are mated to the outer sides of the blade assembly illustrated in step 950 so that a channel 860 is formed about the circumference of the blade assembly. The edging material 850 is then laid in the channel 860 about the circumference of the blade assembly to create the final uncured blade assembly. The uncured blade assembly is then inserted into a suitable mold configured to impart the desired exterior shape of the blade 30 (step 610 of FIG. 15A), heat is applied to the mold to cure (step 620 of FIG. 15A), and then the cured blade 30 is removed from the mold and finished 30 for attachment (step 630 of FIG. 15A). Notable is that the construction process described in relation to FIGS. 16A-C has been found to be readily facilitated by the inherent adhesion characteristics of the pre-impregnated plies 520.

FIG. 14F illustrates a sixth preferred construction of the hockey stick blade 30 which also comprises a plurality of inner core elements 500a"" and 500b"" overlaid with plies 520a"" and 520b"". As in the construction illustrated in FIG. 14D, extending between the inner core elements 500a"" and 500b"" is a bead 590' of preferably pre-impregnated fiber material that forms an internal bridge structure 530"". Around the circumference of the blade 30 is preferably an edging material 550' such as that discussed in relation to FIG. 14E. In application, the incorporation of the bead of material may be achieved as discussed in relation to FIG. 14D. Once the bead material is disposed between the core elements 500a"" and 500b"", the remaining construction is similar to that discussed in relations to steps 950 and 960 of FIG. 16C. Namely, (1) oversized outer layers are mated to the core elements having the bead material disposed there between, (2) the edging material 550' is then preferably wrapped around the circumference of the foam core members 500a"" and 500b"" in the channel created by the sides of the outer layers, and (3) the uncured blade assembly is loaded into a mold to cure.

FIG. 14G illustrates a seventh preferred construction of the hockey stick blade 30 and FIG. 15B details the preferred steps for manufacturing the blade 30 illustrated in FIG. 14F. In this preferred construction, bulk molding compound 580 (i.e., non-continuous fibers disposed in a matrix material or resin base) of the type previously described is loaded into a mold configured for molding the desired exterior shape of the blade 30 (step 700 of FIG. 15B). With respect to the loading of the mold, it has been found preferable to somewhat overload the mold with compound so that when the mold is sealed or closed the excess compound material exudes from the mold. Such a loading procedure has been found to improve the exterior surface of the blade 30 and the curing process. Once the mold is loaded, heat is applied to the mold to cure (step 710) and the cured blade 30 is removed from the mold and finished, if necessary, to the desired appearance (step 720).

FIG. 17A-C illustrates a preferred embodiment of an adapter member 1000. The adapter member 1000 is configured at a first end section 1010 to receive the tongue 260 of the blade 30 illustrated and previously described in relation to FIGS. 3 and 7. A second end section 1020 of the adapter member 1000 is configured to be connectable to a shaft. In the preferred embodiment, the second end section 1020 is configured to be receivable in the hollow of the shaft 20 illustrated and previously described in relation to FIGS. 10-12. In particular, the adapter member 1000 is comprised of a first and second wide opposed walls 1030, 1040 and a first and second narrow opposed wall 1050, 1060. The first wide opposed wall 1030 includes a front facing surface 1070 and the second wide opposed wall includes a back facing surface 1080 such that when the adapter member 1000 is joined to the blade 30 the front facing surface 1070 generally faces in the same direction as the front face 90 of the blade 30 and the back facing surface 1080 generally faces in the same direction as the back face 100 of the blade 30. The first narrow opposed wall 1050 includes forward facing surface 1090 and the second narrow opposed wall includes a rearward facing surface 1100, such that when the adapter member 1000 is joined to the blade 30 the forward facing surface 1090 generally faces toward the tip section 130 of the blade and is generally perpendicular to the longitudinal length of the blade 30 (i.e., the length of the blade from the tip section 130 to the heel section 140) the rearward facing surface 1100 generally faces away from the tip section 130 of the blade 30.

The adapter member 1000 further includes a tapered section 330' having a reduced width between the front and back facing surfaces 1070 and 1080. The tapered section 330' is preferably dimensioned so that when the adapter member 1000 is joined to the blade 30 the front and back facing surfaces 1070, 1080 are generally flush with the adjacent portions of the front and back faces 90 and 100 of the blade 30.

The first end section 1010 includes an open-ended slot 230' that extends from the forward facing surface 1090 of narrow wall 1050 preferably through the rearward facing surface 1100 of narrow wall 1060. The slot 230' also preferably extends through the end surface 1110 of the adapter member 1000. The slot 230' is dimensioned to receive, preferably slidably, the recessed tongue portion 260 located at the heel section 140 of the blade 30 illustrated in FIGS. 3 and 7.

As previously discussed in relation to the shaft illustrated in FIGS. 1-2 and 5-6, when the slot 230' is joined to the tongue portion 260, the forward facing surface 1090 on either side of the slot 230' opposes and preferably abuts the front and back side shoulders 280, 290 of the blade 30 to form a joint similar to an open slot mortise and tongue joint. In addition, the rearward-facing edge 320 of the tongue 260 is preferably flush with the rearward facing surface 1100 of the adapter member 1000 on either side of the slot 230'; the upper edge 300 of the tongue 260 opposes and preferably abuts with the top surface 360' of the slot 230'; and the front and back side surfaces 370, 380 of the tongue 260 oppose and preferably abut with the inner sides 430', 440' of the wide opposed walls 1030 and 1040 of the adapter member 1000.

Moreover, when joined to the blade 30 configuration illustrated in FIG. 3, the end surface 1110 of the adapter member 1000 on either side of the slot 230' is preferably flush with the lower edge 310 of the tongue 260. Alternatively, when joined to the blade 30 configuration illustrated in FIG. 7, the end surface 1110 of the adapter member 1000 on either side of the slot 230' opposes and preferably abuts shoulders 240 and 250 and the forward facing edge 340 of the tongue 260 is preferably flush with the forward facing surface 1090 of the adapter member 1000 on either side of the slot 230'.

The second end section 1020 of the adapter member 1000, as previously stated is preferably configured to be receivable in the hollow of the shaft 20 previously described and illustrated in relation to FIGS. 10-12 and includes substantially the same configuration as the mating section 460 described in relation to FIGS. 10-13. In particular, the second end section 1020 in a preferred embodiment is comprised of a rectangular cross section having two sets of opposed walls 1030a, 1040a and 1050a, 1060a that are adapted to mate with the lower section 60 of the shaft 20 in a four-plane lap joint along the inside of walls 150, 160, 170, and 180 (best illustrated in FIG. 11). The outside diameter of the rectangular cross-sectional area of the second end section 1020 is preferably dimensioned to make a sliding fit inside the hollow center of the lower section 60 of the shaft 20. Preferably, the adapter member 1000 and shaft 20 are bonded together at the four-plane lap joint using an adhesive capable of removably cementing the adapter member 1000 to the shaft 20 as previously discussed in relation FIGS. 10-13.

It is to be understood that the adapter member 1000 may be comprised of various materials including the composite type constructions previously discussed (i.e., substantially continuous fibers disposed within a resin and wrapped about a foam core as illustrated in FIG. 14A-E, non-continuous fibers disposed in a resin as illustrated in FIG. 14F) and may also be constructed of wood or wood laminate or wood or wood laminate overlaid with outer protective material such as fiberglass. It is noted that when constructed of wood, a player may obtain the desired wood construction "feel" while retaining the performance of a composite blade construction since the adapter member 1000 joining the blade and the shaft would be comprised of wood.

Illustrated in FIG. 17D is a perspective view of a hockey stick comprising the blade 30 illustrated in FIG. 3, the adapter member 1000 illustrated in FIGS. 17A-C, and the shaft 20 illustrated in FIGS. 10-12.

It is to be appreciated and understood that shafts 20, illustrated in FIGS. 1-2 and 5-6, may be constructed of various materials including wood or wood laminate or wood or wood laminate overlaid with outer protective material such as fiberglass. Such a shaft 20 construction in combination with the blade 30 illustrated in FIGS. 1-8 and 17D the construction of which being illustrated in FIGS. 14A-G, 15A-B, and 16A-C results in a unique hybrid hockey stick configuration (i.e., a traditional "wood" shaft attached to a "composite" blade), which may provide the desired "feel" sought by hockey players and the public.

In addition, it should be also understood that while all or a portion of the recessed tongue portion 260 of the heel 140 may be comprised of a foam core overlaid with plies of substantially continuous fibers disposed in a matrix material; it may also be preferable that all or a portion of the recessed tongue portion 260 of the heel 140 be comprised of plies of substantially continuous fibers disposed in a matrix material without a foam core. Such a construction may comprise of a build-up of additional plies relative to the other portion of the blade and may improve the rigidity of the joint and provide a more desirable flex as was described in relation to the internal bridge structures) 530 described in relation to FIGS. 14A through 14F.

While there has been illustrated and described what are presently considered to be preferred embodiments and features of the present invention, it will be understood by those skilled in the art that various changes and modifications may be made, and equivalents may be substituted for elements thereof, without departing from the scope of the invention.

In addition, many modifications may be made to adapt a particular element, feature or implementation to the teachings of the present invention without departing from the central scope of the invention. Therefore, it is intended that this invention not be limited to the particular embodiments disclosed herein, but that the invention include all embodiments falling within the scope of the appended claims.

What is claimed is:

1. A hockey stick blade comprising:
   an elongated member extending longitudinally from a tip section to a heel section and vertically from a top section to a bottom section to form a front facing wall and a generally opposing back facing wall, each wall defining an exterior facing surface and an interior facing surface;
   said front and back facing walls being comprised of fibers disposed within a hardened matrix material;
   said front and back facing walls being spaced apart at their mid-sections and merged together at their perimeter edges to define an interior cavity there between; and
   wherein the exterior surface of at least one of the front or the back facing walls includes one or more incurved regions that defines an exterior cavity.

2. The hockey stick blade of claim 1, further comprising a filler material residing within at least one exterior cavity.

3. The hockey stick blade of claim 2, wherein the filler material is dissimilar from the material that forms the wall that defines the exterior cavity within which the filler material resides.

4. The hockey stick blade of claim 2, wherein the filler material is comprised of a material selected from the group consisting of fiberglass, urethane, epoxy, ABS, styrene, polystyrene, and resin.

5. The hockey stick blade of claim 2, wherein the filler material completely fills at least one exterior cavity.

6. The hockey stick blade of claim 1, wherein the interior facing surface of one of said front or back facing walls, at an incurved region, extends to the interior facing surface of the opposing wall.

7. The hockey stick blade of claim 6, wherein the interior facing surface of one of said front or back walls, at the incurved region, extends toward and meets the interior facing surface of the opposing wall.

8. The hockey stick blade of claim 6, wherein the interior facing surface of one of said front or back walls, at the incurved region, extends toward and adjoins the interior facing surface of the opposing wall.

9. The hockey stick blade of claim 1, wherein both the front and back facing walls include generally opposing incurved regions that define respective exterior cavities.

10. The hockey stick blade of claim 9, further comprising a filler material residing within the exterior cavities defined by said opposing incurved regions.

11. The hockey stick blade of claim 10, where said filler material is dissimilar from the material that forms the wall and defines the exterior cavity within which the filler material resides.

12. The hockey stick blade of claim 10, wherein the filler material is comprised of a material selected from the group consisting of fiberglass, urethane, epoxy, ABS, styrene, polystyrene, and resin.

13. The hockey stick blade of claim 9, wherein the interior facing surfaces of said front and back facing walls at the generally opposed incurved regions extend toward one another.

14. The hockey stick blade of claim 9, wherein the interior facing surfaces of said front and back facing walls at the generally opposed incurved regions extend toward and meet one another.

15. The hockey stick blade of claim 9, wherein the interior facing surfaces of said front and back facing walls at the generally opposed incurved regions extend toward and adjoin with one another.

16. The hockey stick blade of claim 1, wherein said front and back facing walls are comprised of at least one ply of substantially continuous fibers disposed within said hardened matrix material.

17. The hockey stick blade of claim 1, wherein said front and back facing walls are comprised of at least one ply of aligned fibers disposed within said hardened matrix material.

18. The hockey stick blade of claim 1, wherein said front and back facing walls are comprised of at least one ply of fibers disposed within a hardened matrix material in a first defined orientation and a second ply of fibers disposed within a hardened matrix material in a second defined orientation wherein said first and second defined orientations are different from one another.

19. The hockey stick blade of claim 1 further including at least one core component residing within said interior cavity.

20. The hockey stick blade of claim 19, wherein at least one of the core components is formed of a foam material.

21. A hockey stick comprising:
a shaft and
a blade joined to the shaft, said blade comprising:
(a) an elongated member extending longitudinally from a tip section to a heel section and vertically from a top section to a bottom section to form a front facing wall and a generally opposing back facing wall, each wall defining an exterior facing surface and an interior facing surface;
(b) said front and back facing walls being comprised of fibers disposed within a hardened matrix material;
(c) said front and back facing walls being spaced apart at their mid-sections and merged together at their perimeter edges to define an interior cavity there between; and
(d) wherein the exterior surface of at least one of the front or the back facing walls includes one or more incurved regions that defines an exterior cavity.

22. The hockey stick of claim 21, further comprising a filler material residing within at least one exterior cavity.

23. The hockey stick of claim 22, wherein the filler material is dissimilar from the material that forms the wall that defines the exterior cavity within which the filler material resides.

24. The hockey stick of claim 22, wherein the filler material is comprised of a material selected from the group consisting of fiberglass, urethane, epoxy, ABS, styrene, polystyrene, or resin.

25. The hockey stick of claim 22, wherein the filler material completely fills at least one exterior cavity.

26. The hockey stick of claim 21, wherein the interior facing surface of one of said front or back facing walls, at an incurved region, extends to the interior facing surface of the opposing wall.

27. The hockey stick of claim 26, wherein the interior facing surface of one of said front or back walls, at the incurved region, extends toward and meets the interior facing surface of the opposing wall.

28. The hockey stick of claim 26, wherein the interior facing surface of one of said front or back walls, at the incurved region, extends toward and adjoins the interior facing surface of the opposing wall.

29. The hockey stick of claim 21, wherein both the front and back facing walls include generally opposing incurved regions that define respective exterior cavities.

30. The hockey stick of claim 29, further comprising a filler material residing within the exterior cavities defined by said opposing incurved regions.

31. The hockey stick of claim 30, where said filler material is dissimilar from the material that forms the wall and defines the exterior cavity within which the filler material resides.

32. The hockey stick of claim 30, wherein the filler material is comprised of a material selected from the group consisting of fiberglass, urethane, epoxy, ABS, styrene, polystyrene, and resin.

33. The hockey stick of claim 29, wherein the interior facing surfaces of said front and back facing walls at the generally opposed incurved regions extend toward one another.

34. The hockey stick of claim 29, wherein the interior facing surfaces of said front and back facing walls at the generally opposed incurved regions extend toward and meet one another.

35. The hockey stick of claim 29, wherein the interior facing surfaces of said front and back facing walls at the generally opposed incurved regions extend toward and adjoin with one another.

36. The hockey stick of claim 21, wherein said front and back facing walls are comprised of at least one ply of substantially continuous fibers disposed within said hardened matrix material.

37. The hockey stick of claim 21, wherein said front and back facing walls are comprised of at least one ply of aligned fibers disposed within said hardened matrix material.

38. The hockey stick of claim 21, wherein said front and back facing walls are comprised of at least one ply of fibers disposed within a hardened matrix material in a first defined orientation and a second ply of fibers disposed within a hardened matrix material in a second defined orientation wherein said first and second defined orientations are different from one another.

39. The hockey stick of claim 21 further including at least one core component residing within said interior cavity.

40. The hockey stick of claim 39, wherein at least one of the core components is formed of a foam material.

41. A hockey stick comprising:

a shaft and a blade joined to the shaft, said blade comprising:

(a) an elongated member extending longitudinally from a tip section to a heel section and vertically from a top section to a bottom section to form a front facing wall and a generally opposing back facing wall, each wall defining an exterior facing surface and an interior facing surface;

(b) said front and back facing walls being comprised of fibers disposed within a hardened matrix material;

(c) said front and back facing walls being spaced apart at their mid-sections and merged together at their perimeter edges to define an interior cavity there between; and (d) wherein the exterior surface of the back facing wall includes multiple incurved regions that define exterior cavities that are spaced apart from one another.

42. The hockey stick of claim 41, further comprising a filler material residing within at least one of the exterior cavities.

* * * * *